(12) United States Patent
Metcalf et al.

(10) Patent No.: US 12,465,408 B2
(45) Date of Patent: Nov. 11, 2025

(54) SPINAL ROD CONNECTING COMPONENTS WITH ACTIVE SENSING CAPABILITIES

(71) Applicant: Warsaw Orthopedic, Inc., Warsaw, IN (US)

(72) Inventors: Newton H. Metcalf, Memphis, TN (US); Arjun Siby-Kurian, Memphis, TN (US); Mark C. Dace, Collierville, TN (US); Steven C. Alley, Germantown, TN (US)

(73) Assignee: WARSAW ORTHOPEDIC, INC., Warsaw, IN (US)

( * ) Notice: Subject to any disclaimer, the term of this patent is extended or adjusted under 35 U.S.C. 154(b) by 0 days.

(21) Appl. No.: 18/062,867

(22) Filed: Dec. 7, 2022

(65) Prior Publication Data

US 2023/0320760 A1  Oct. 12, 2023

Related U.S. Application Data

(60) Provisional application No. 63/329,982, filed on Apr. 12, 2022.

(51) Int. Cl.
*A61B 17/70* (2006.01)
*A61B 5/00* (2006.01)
(Continued)

(52) U.S. Cl.
CPC ........ *A61B 17/7032* (2013.01); *A61B 5/0031* (2013.01); *A61B 5/4566* (2013.01);
(Continued)

(58) Field of Classification Search
CPC .......... A61B 17/7032–17/7034; A61B 5/0031; A61B 5/0024; A61B 5/4566; A61B 5/4851; A61B 5/686; A61B 2562/0261
See application file for complete search history.

(56) References Cited

U.S. PATENT DOCUMENTS 3,444,775 A  5/1969  Hills
5,697,929 A  12/1997  Mellinger
(Continued)

FOREIGN PATENT DOCUMENTS

CN  103140168 A  6/2013
CN  110582229 A  12/2019
(Continued)

OTHER PUBLICATIONS

International Search Report and Written Opinion in Application No. PCT/IB2023/053707 dated Jul. 24, 2023.
(Continued)

*Primary Examiner* — Julianna N Harvey
(74) *Attorney, Agent, or Firm* — FOX ROTHSCHILD LLP

(57) ABSTRACT

A digital pedicle screw assembly may be installed inside of the body of a patient and be configured to sense various attributes of the assembly and the patient. Embodiments may include a receiver having a U-shaped cavity for supporting a longitudinal rod and set screw therein. The receiver may include a lower cavity configured to couple to a pedicle screw and a side portion integrally connected to the receiver and including a housing defining a sealed cavity for supporting a microelectronics assembly and a battery therein. Embodiments may include at least one antenna attached to an outside of the housing and being in electrical communication with the microelectronics assembly, and at least one strain gauge configured to detect a localized force experienced by the receiver and being in electrical communication with the microelectronics assembly.

15 Claims, 20 Drawing Sheets

(51) Int. Cl.
*A61F 2/44* (2006.01)
*A61F 2/46* (2006.01)

(52) U.S. Cl.
CPC ............ *A61B 5/4851* (2013.01); *A61B 5/686* (2013.01); *A61B 2562/0261* (2013.01); *A61F 2/44* (2013.01); *A61F 2002/4666* (2013.01)

(56) References Cited

U.S. PATENT DOCUMENTS

| | | | |
|---|---|---|---|
| 6,004,349 | A | 12/1999 | Jackson |
| 6,179,841 | B1 | 1/2001 | Jackson |
| 6,280,445 | B1 | 8/2001 | Morrison et al. |
| 6,485,491 | B1 | 11/2002 | Farris et al. |
| 6,884,244 | B1 | 4/2005 | Jackson |
| 7,357,037 | B2 | 4/2008 | Hnat et al. |
| 7,993,269 | B2 | 8/2011 | Donofrio et al. |
| 8,057,519 | B2 | 11/2011 | Justis et al. |
| 8,372,147 | B2 | 2/2013 | Roche |
| 8,868,200 | B2 | 10/2014 | Abrahamson et al. |
| 8,882,803 | B2 | 11/2014 | Iott et al. |
| 9,241,738 | B2 | 1/2016 | Quevedo et al. |
| 9,498,294 | B2 | 11/2016 | Rigsby et al. |
| 9,585,602 | B1 | 3/2017 | Navarro et al. |
| 9,711,840 | B2 | 7/2017 | Lin |
| 10,219,699 | B2 | 3/2019 | Wilder et al. |
| 10,362,982 | B2 | 7/2019 | Stevenson et al. |
| 2003/0073996 | A1 | 4/2003 | Doubler et al. |
| 2005/0018749 | A1 | 1/2005 | Sato et al. |
| 2005/0187549 | A1 | 8/2005 | Jackson |
| 2005/0228326 | A1 | 10/2005 | Kalfas et al. |
| 2005/0267477 | A1 | 12/2005 | Jackson |
| 2006/0052782 | A1 | 3/2006 | Morgan et al. |
| 2007/0017295 | A1 | 1/2007 | Ohta et al. |
| 2007/0073300 | A1 | 3/2007 | Attawia et al. |
| 2007/0100218 | A1 | 5/2007 | Sweitzer et al. |
| 2008/0133009 | A1 | 6/2008 | Caylor |
| 2008/0281212 | A1 | 11/2008 | Nunez et al. |
| 2009/0143696 | A1 | 6/2009 | Najafi et al. |
| 2009/0171178 | A1 | 7/2009 | He et al. |
| 2009/0198273 | A1 | 8/2009 | Zhang et al. |
| 2009/0228074 | A1* | 9/2009 | Edgell ...................... H01Q 1/40 607/60 |
| 2009/0234391 | A1 | 9/2009 | Butler et al. |
| 2009/0298650 | A1 | 12/2009 | Kutliroff |
| 2010/0152621 | A1 | 6/2010 | Janna et al. |
| 2010/0201118 | A1 | 8/2010 | Anton et al. |
| 2010/0217331 | A1 | 8/2010 | Spagnoli et al. |
| 2010/0298886 | A1 | 11/2010 | Kraus et al. |
| 2011/0106179 | A1 | 5/2011 | Prevost et al. |
| 2011/0213221 | A1 | 9/2011 | Roche |
| 2011/0319755 | A1 | 12/2011 | Stein et al. |
| 2012/0059389 | A1* | 3/2012 | Larson .................. G16H 40/67 607/116 |
| 2012/0143029 | A1 | 6/2012 | Silverstein et al. |
| 2012/0221057 | A1 | 8/2012 | Zhang et al. |
| 2013/0072982 | A1 | 3/2013 | Simonson |
| 2013/0076157 | A1 | 3/2013 | Stein |
| 2013/0079669 | A1 | 3/2013 | Stein et al. |
| 2013/0079680 | A1 | 3/2013 | Stein et al. |
| 2013/0096396 | A1 | 4/2013 | Riedel |
| 2013/0253334 | A1 | 9/2013 | Al-Ali et al. |
| 2014/0214097 | A1 | 7/2014 | Jackson et al. |
| 2015/0080901 | A1 | 3/2015 | Stein |
| 2015/0164401 | A1 | 6/2015 | Toth et al. |
| 2015/0201974 | A1 | 7/2015 | DeRidder et al. |
| 2015/0257687 | A1* | 9/2015 | Pushpala ................... A61B 5/01 600/345 |
| 2016/0128573 | A1* | 5/2016 | Wilder ................. A61B 5/0031 606/102 |
| 2016/0235480 | A1 | 8/2016 | Scholl et al. |
| 2016/0331415 | A1 | 11/2016 | Serhan et al. |
| 2017/0007420 | A1 | 1/2017 | Stevenson et al. |
| 2017/0079555 | A1 | 3/2017 | Munro et al. |
| 2017/0138387 | A1 | 5/2017 | Saigo et al. |
| 2017/0196499 | A1 | 7/2017 | Hunter |
| 2017/0196508 | A1 | 7/2017 | Hunter |
| 2017/0231559 | A1 | 8/2017 | Cuevas et al. |
| 2018/0195547 | A1 | 7/2018 | Demeocq |
| 2018/0310964 | A1* | 11/2018 | Stevenson .......... A61B 17/7049 |
| 2019/0038214 | A1 | 2/2019 | Mikhail et al. |
| 2019/0344070 | A1* | 11/2019 | Molnar ................ A61N 1/0558 |
| 2019/0346313 | A1 | 11/2019 | Cox |
| 2020/0022733 | A1* | 1/2020 | Benson .................. A61B 5/686 |
| 2020/0022735 | A1* | 1/2020 | Fields .................. A61B 5/4566 |
| 2020/0022739 | A1 | 1/2020 | Benson et al. |
| 2020/0022740 | A1* | 1/2020 | Benson .................. A61B 90/06 |
| 2020/0022772 | A1* | 1/2020 | Benson ................ A61B 5/4566 |
| 2020/0069247 | A1 | 3/2020 | Hunter |
| 2020/0085366 | A1 | 3/2020 | Benson et al. |
| 2020/0297513 | A1 | 9/2020 | Zellmer et al. |
| 2020/0330230 | A1 | 10/2020 | Macewan et al. |
| 2020/0405239 | A1 | 12/2020 | Trabish et al. |
| 2021/0153909 | A1 | 5/2021 | Siby-Kurian et al. |
| 2021/0186567 | A1 | 6/2021 | Bobbitt et al. |
| 2021/0361377 | A1 | 11/2021 | Metcalf et al. |
| 2022/0160428 | A1 | 5/2022 | Murray et al. |
| 2022/0273391 | A1 | 9/2022 | Metcalf, Jr. et al. |
| 2022/0378370 | A1* | 12/2022 | Pasha .................. A61B 5/4504 |

FOREIGN PATENT DOCUMENTS

| | | |
|---|---|---|
| JP | 2015532841 A | 11/2015 |
| KR | 10-1851690 B1 | 4/2018 |
| WO | 2013109762 A1 | 7/2013 |
| WO | 15/200720 A2 | 12/2015 |
| WO | 2017006068 A1 | 1/2017 |
| WO | 2017007821 A1 | 1/2017 |
| WO | 2017165717 A1 | 9/2017 |
| WO | 2017180653 A1 | 10/2017 |
| WO | 2020018862 A1 | 1/2020 |

OTHER PUBLICATIONS

Chinese Office Action in Application No. 201980047442.2 dated Jun. 27, 2023.
International Search Report, PCT/US2019/042511, Oct. 31, 2019.
International Search Report, PCT/US2019/042516, Oct. 31, 2019.
International Search Report and Written Opinion in Application No. PCT/US2019/050717 mailed Jan. 3, 2020.
International Search Report and Written Opinion in Application No. PCT/US2020/041487 mailed Nov. 2, 2020.
Rodriguez-Martin, et al. "A wearable inertial measurement unit for long-term monitoring in the dependency care area." Sensors 13.10 (2013): 14079-14104. (Year: 2016).
Conway, Justin, Christy C. Tomkins, and Andrew J. Haig. "Walking assessment in people with lumbar spinal stenosis: capacity, performance, and self-report measures." The Spine Journal 11.9 (2011): 816-823. (Year: 2011).
Trost, et al. "Conducting accelerometer-based activity assessments in field-based research." Medicine & Science in Sports & Exercise 37.11 (2005): S531-S543. (Year: 2005).
Liu, Ye, et al. "From action to activity: sensor-based activity recognition." Neurocomputing 181 (2016): 108-115. (Year: 2016).
Ahmadi, Amin, et al. "Automatic activity classification and movement assessment during a sports training session using wearable inertial sensors." 2014 11th International Conference on Wearable and Implantable Body Sensor Networks. IEEE, 2014. (Year: 2014).
European Search Report in Application No. 21168012.9 dated Sep. 20, 2021.
European Search Report in Application No. 19838132.9 dated Apr. 4, 2022.
European Search Report in Application No. 19837036.3 dated Apr. 4, 2022.
European Search Report in Application No. 19838911.6 dated Apr. 4, 2022.
International Search Report and Written Opinion in Application No. PCT/IB2023/053705 dated Jul. 7, 2023.
European Search Report in Application No. 20837889 dated Apr. 25, 2023.

(56) References Cited

OTHER PUBLICATIONS

Karipott Salil Sidharthan et al: "An Embedded Wireless Temperature Sensor for Orthopedic Implants", IEEE Sensors Journal, IEEE, USA, vol. 18, No. 3, Feb. 1, 2018 (Feb. 1, 2018), pp. 1265-1272, XP011675608, ISSN: 1530-437X, DOI: 10.1109/JSEN.2017.2780226.
International Search Report and Written Opinion in Application No. PCT/IB2023/053713 dated Jul. 28, 2023.
Chinese Office Action in Application No. 202110429353.3 dated Feb. 17, 2025.
International Search Report in Application No. PCT/IB2024/054039 date of completion is Jun. 27, 2024 (13 pages).

* cited by examiner

SPINAL ROD CONNECTING COMPONENTS WITH ACTIVE SENSING CAPABILITIES

CROSS-REFERENCE TO RELATED APPLICATIONS

This application claims priority to U.S. Provisional Application 63/329,982, titled SMART IMPLANT DESIGNS FOR HOUSING A POWER SOURCE, ANTENNA, GAUGES, AND MICROELECTRONICS, and filed Apr. 12, 2022. The entire contents of which are incorporated herein by reference in entirety.

FIELD

The present disclosure generally relates to mechanical and electrical sensor assemblies and antenna designs for implant devices, and more particularly to implant systems including a set screw that may be used to secure a connection between a longitudinal rod and a pedicle screw, hook or other connector which may be used to treat various spinal disorders.

BACKGROUND

Treatment of spinal disorders, such as degenerative disc disease, disc herniations, scoliosis or other curvature abnormalities, and fractures, often requires surgical treatments. For example, spinal fusion may be used to limit motion between vertebral members. As another example, implants may be used to preserve motion between vertebral members.

Surgical treatment typically involves the use of longitudinal members, such as spinal rods. Longitudinal members may be attached to the exterior of two or more vertebral members to assist with the treatment of a spinal disorder. Longitudinal members may provide a stable, rigid column that helps bones to fuse, and may redirect stresses over a wider area away from a damaged or defective region. Also, rigid longitudinal members may help in spinal alignment.

Screw assemblies may be used to connect a longitudinal member to a vertebral member. A screw assembly may include a pedicle screw, hook, tulip bulb connector or other type of receiver, and a set screw, among other components. A pedicle screw can be placed in, above and/or below vertebral members that were fused, and a longitudinal member can be used to connect the pedicle screws which inhibits or controls movement. A set screw can be used to secure the connection of a longitudinal member and a pedicle screw, hook, or other connector. However, the connection force and continued integrity of the connection between a longitudinal member and a pedicle screw or other connector can be challenging to monitor during and after implantation. In addition, it is difficult to monitor that an appropriate force is maintained between a set screw and a longitudinal member. Conventional load assemblies and/or screw assemblies are not capable of sensing and transmitting the connection force between a longitudinal rod and a pedicle screw installed within a patient. Furthermore, they cannot continuously monitor and maintain a secure connection on relatively long-time frames.

SUMMARY

The techniques of this disclosure generally relate to spinal implants having various sensors for communicating attributes about the spinal implants when installed in patient anatomy to an external reader.

In one aspect, the present disclosure provides a load sensing spinal implant, the implant may include a receiver comprising a U-shaped cavity for supporting a longitudinal rod and set screw therein, and the receiver may include a lower cavity configured to couple to a pedicle screw. Disclosed embodiments may include a side portion integrally connected to the receiver and including a housing defining a sealed cavity for supporting a microelectronics assembly and a battery therein. Disclosed embodiments may include at least one antenna attached to an outside of the housing that is in electrical communication with the microelectronics assembly. Disclosed embodiments may include at least one strain gauge configured to detect a localized force experienced by the receiver and being in electrical communication with the microelectronics assembly. In at least some embodiments, the at least one antenna is configured to transmit information received from the at least one strain gauge to an external device.

In another aspect, the disclosure provides for a load sensing spinal implant including a receiver having a U-shaped cavity for supporting a longitudinal rod and set screw therein. In various embodiments, the receiver may include a lower cavity configured to couple to a pedicle screw. Disclosed embodiments may include a side portion integrally connected to the receiver by an isolation beam, the side portion including a housing defining a sealed cavity for supporting a microelectronics assembly and a battery therein. Disclosed embodiments may include at least one antenna attached to an outside of the housing and being in electrical communication with the microelectronics assembly, and the at least one antenna may be configured to utilize a Medical Implant Communication System (MICS) technology. Disclosed embodiments may include at least one strain gauge disposed in a region corresponding to the isolation beam, and the at least one strain gauge may be configured to detect a localized force experienced by the receiver and be in electrical communication with the microelectronics assembly. In at least some embodiments, the at least one antenna may be configured to transmit information received from the at least one strain gauge to an external device.

In another aspect, a load sensing spinal implant including a receiver having a U-shaped cavity for supporting a longitudinal rod and set screw therein is disclosed. The receiver may include a lower cavity configured to couple to a pedicle screw. In various embodiments, a side portion may be integrally connected to the receiver and include a housing defining a sealed cavity for supporting a microelectronics assembly and a battery therein. In disclosed embodiments, at least one antenna may be attached to an outside of the housing and be in electrical communication with the microelectronics assembly, and the at least one antenna may be configured to utilize a Medical Implant Communication System (MICS) technology. In various embodiments, at least one strain gauge may be configured to detect a localized force experienced by the receiver and be in electrical communication with the microelectronics assembly. In at least some embodiments, the at least one antenna may be configured to transmit information received from the at least one strain gauge to an external device, and the at least one strain gauge may be disposed within a cavity inside of the receiver at a relative height that disposes the at least one strain gauge at a height that is below a lower surface of the U-shaped cavity.

The details of one or more aspects of the disclosure are set forth in the accompanying drawings and the description below. Other features, objects, and advantages of the tech-

DETAILED DESCRIPTION

Figure 1:
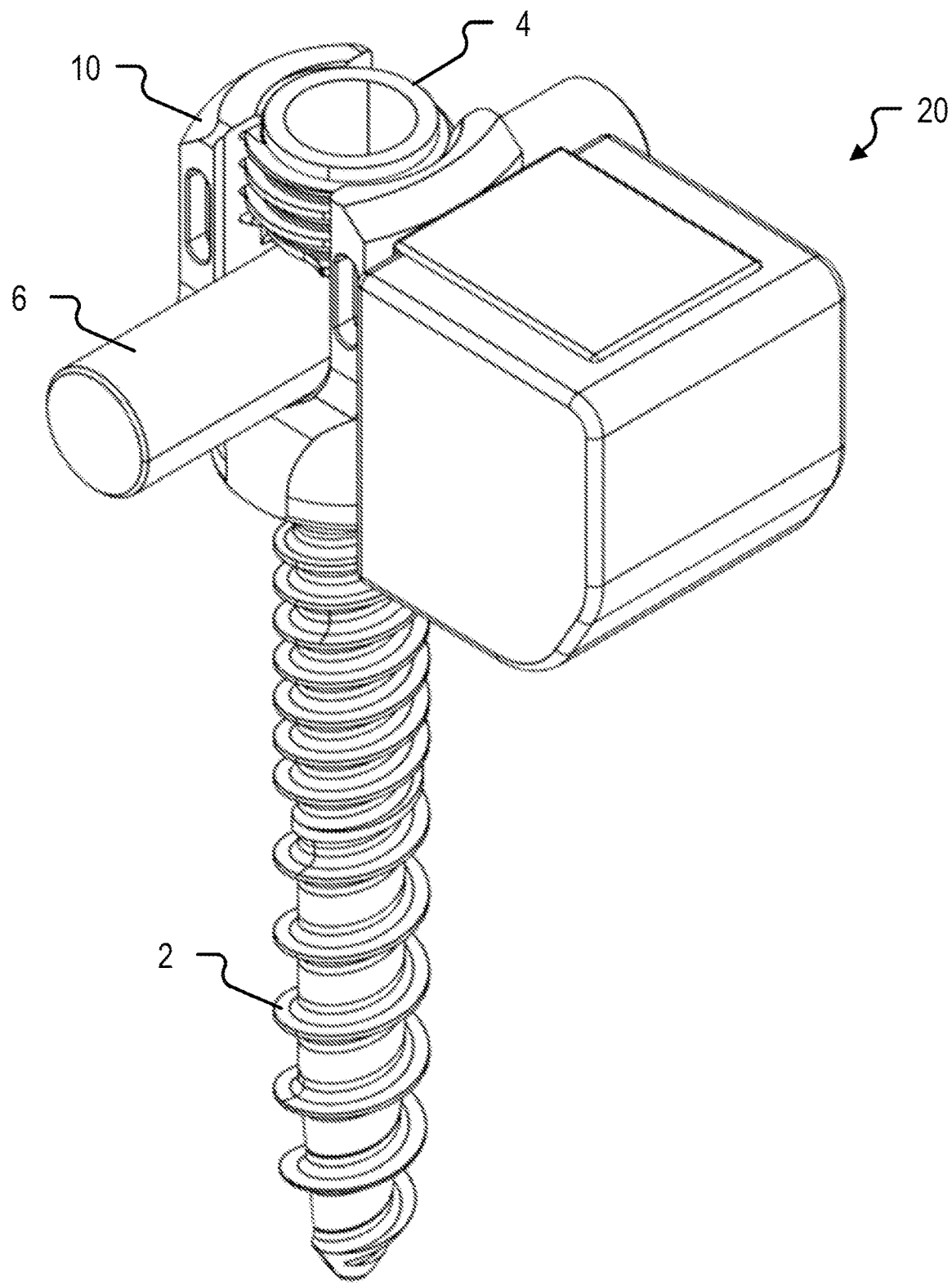
FIG. 1 is a perspective view of a first embodiment of a pedicle screw system.

Embodiments of the present disclosure relate generally, for example, to spinal stabilization systems, and more particularly, to spinal stabilization systems with active sensing, microelectronics, and communication abilities. Embodiments of the devices and methods are described below with reference to the Figures.

The following discussion omits or only briefly describes certain components, features and functionality related to medical implants, installation tools, and associated surgical techniques, which are apparent to those of ordinary skill in the art. It is noted that various embodiments are described in detail with reference to the drawings, in which like reference numerals represent like parts and assemblies throughout the several views, where possible. Reference to various embodiments does not limit the scope of the claims appended hereto because the embodiments are examples of the inventive concepts described herein. Additionally, any example(s) set forth in this specification are intended to be non-limiting and set forth some of the many possible embodiments applicable to the appended claims. Further, particular features described herein can be used in combination with other described features in each of the various possible combinations and permutations unless the context or other statements clearly indicate otherwise.

Terms such as "same," "equal," "planar," "coplanar," "parallel," "perpendicular," etc. as used herein are intended to encompass a meaning of exactly the same while also including variations that may occur, for example, due to manufacturing processes. The term "substantially" may be used herein to emphasize this meaning, particularly when the described embodiment has the same or nearly the same functionality or characteristic, unless the context or other statements clearly indicate otherwise. The term "about" may encompass a meaning of being +/-10% of the stated value.

Referring to the disclosed embodiments generally, various vertebral pedicle screw systems are disclosed. The components of the vertebral pedicle screw systems can be fabricated from biologically acceptable materials suitable for medical applications, including metals, synthetic polymers, ceramics and bone material and/or their composites. For example, the components, individually or collectively, can be fabricated from materials such as stainless steel alloys, commercially pure titanium, titanium alloys, Grade 5 titanium, super-elastic titanium alloys, cobalt-chrome alloys, superelastic metallic alloys (e.g., Nitinol, super elasto-plastic metals, such as GUM METAL®), ceramics and composites thereof such as calcium phosphate (e.g., SKELITE™), thermoplastics such as polyaryletherketone (PAEK) including polyetheretherketone (PEEK), polyetherketoneketone (PEKK) and polyetherketone (PEK), carbon-PEEK composites, PEEK-BaSO4 polymeric rubbers, polyethylene terephthalate (PET), fabric, silicone, polyurethane, silicone-polyurethane copolymers, polymeric rubbers, polyolefin rubbers, hydrogels, semi-rigid and rigid materials, elastomers, rubbers, thermoplastic elastomers, thermoset elastomers, elastomeric composites, rigid polymers including polyphenylene, polyamide, polyimide, polyetherimide, polyethylene, epoxy, bone material including autograft, allograft, xenograft or transgenic cortical and/or corticocancellous bone, and tissue growth or differentiation factors, partially resorbable materials, such as, for example, composites of metals and calcium-based ceramics, composites of PEEK and calcium based ceramics, composites of PEEK with resorbable polymers, totally resorbable materials, such as, for example, calcium based ceramics such as calcium phosphate, tri-calcium phosphate (TCP), hydroxyapatite (HA)-TCP, calcium sulfate, or other resorbable polymers such as polyaetide, polyglycolide, polytyrosine carbonate, polycaroplaetohe, polylactic acid or polylactide and their combinations.

Various components of the vertebral pedicle screw system may be formed or constructed material composites, including the above materials, to achieve various desired characteristics such as strength, rigidity, elasticity, compliance, biomechanical performance, durability and radiolucency or imaging preference. The components of the present vertebral pedicle screw system, individually or collectively, may also be fabricated from a heterogeneous material such as a combination of two or more of the above-described materials. The components of the vertebral pedicle screw system may be monolithically formed, integrally connected or include fastening elements and/or instruments, as described herein. The components of the vertebral pedicle screw system may be formed using a variety of subtractive and additive manufacturing techniques, including, but not limited to machining, milling, extruding, molding, 3D-printing, sintering, coating, vapor deposition, and laser/beam melting.

Furthermore, various components of the vertebral pedicle screw system may be coated or treated with a variety of additives or coatings to improve biocompatibility, bone growth promotion or other features. Various embodiments and components may be coated with a ceramic, titanium, and/or other biocompatible material to provide surface texturing at (a) the macro scale, (b) the micro scale, and/or (c) the nano scale, for example. Similarly, components may undergo a subtractive manufacturing process such as, for example, grit blasting and acid etching, providing for surface texturing configured to facilitate osseointegration and cellular attachment and osteoblast maturation. Example surface texturing of additive and subtractive manufacturing processes may comprise (a) macro-scale structural features having a maximum peak-to-valley height of about 40 microns to about 500 microns, (b) micro-scale structural features having a maximum peak-to-valley height of about 2 microns to about 40 microns, and/or (c) nano-scale structural features having a maximum peak-to-valley height of about 0.05 microns to about 5 microns. In various embodiments, the three types of structural features may be overlapping with one another. Additionally, such surface texturing may be applied to any surface, e.g., both external exposed facing surfaces of components and internal non exposed surfaces of components. Further discussion regarding relevant surface texturing and coatings is described in, for example, U.S. Pat. No. 11,096,796, titled Interbody spinal implant having a roughened surface topography on one or more internal surfaces, and filed on Mar. 4, 2013—the entire disclosure of which is incorporated herein by reference in its entirety. Accordingly, it shall be understood that any of the described coating and texturing processes of U.S. Pat. No. 11,096,796, may be applied to any component of the various embodiments disclosed herein, e.g., the exposed surfaces and internal surfaces. Another example technique for manufacturing an orthopedic implant having surfaces with osteoinducting roughness features including micro-scale structures and nano-scale structures is disclosed in U.S. Pat. No. 10,821,000, the entire contents of which are incorporated herein by reference. Additionally, an example of a commercially available product may be the Adaptix™ Interbody System sold by Medtronic Spine and comprising a titanium cage made with Titan nanoLOCK™.

The vertebral pedicle screw system may be employed, for example, with a minimally invasive procedure, including percutaneous techniques, mini-open and open surgical techniques to deliver and introduce instrumentation and/or one or more spinal implants at a surgical site within a body of a patient, for example, a section of a spine. In some embodiments, the vertebral pedicle screw system may be employed with surgical procedures, as described herein, and/or, for example, corpectomy, discectomy, fusion and/or fixation treatments that employ spinal implants to restore the mechanical support function of vertebrae. In some embodiments, the pedicle screw system may be employed with surgical approaches, including but not limited to: anterior lumbar interbody fusion (ALIF), direct lateral interbody fusion (DLIF), oblique lateral lumbar interbody fusion (OLLIF), oblique lateral interbody fusion (OLIF), transforaminal lumbar Interbody fusion (TLIF), posterior lumbar Interbody fusion (PLIF), various types of posterior or anterior fusion procedures, and any fusion procedure in any portion of the spinal column (sacral, lumbar, thoracic, and cervical).

FIGS. 1-8 illustrate a first digital pedicle screw system 100 and FIGS. 9-19 illustrate a second digital pedicle screw system 200. Referring generally to FIGS. 1-9, an example vertebral anchoring system 100 with active sensing abilities is disclosed. As illustrated in FIG. 1, system 100 may include a pedicle screw 2 and a receiver 10 having a side portion 20 for supporting various electronic components and sensors as will be explained in further detail below. The pedicle screw 2 may have a thread pitch extending along a length thereof for securing the pedicle screw 2 into patient anatomy, e.g., a vertebral body. As seen best in FIG. 5, the pedicle screw 2 may include a head portion 3 that may couple to the receiver 10 in a lower cavity 11. In various embodiments, a lower cavity 11 of receiver 10 may include at least one annular groove for supporting a deformable annular ring or c-ring 13 that captures the head 3 of pedicle screw 2. In this way, receiver 10 may be popped on to the head 3 of a pedicle screw 2 simply by pressing down on receiver 10 as would be understood by a person of ordinary skill in the art.

In various embodiments, the lower cavity 11 and head 3 may be configured to enable coupling of receiver 10 in a multitude of angled orientations with respect to the extension direction of pedicle screw 2. For example, receiver 10 may be configured as a multiaxial receiver. In other embodiments, receiver 10 may be configured as a monoaxial receiver. In various embodiments a saddle 12 may be disposed within the lower cavity 11 of receiver 10 to support a longitudinal rod 6 disposed in the U-shaped cavity of receiver 10. As seen best in FIG. 1, a set screw 4 may engage to threads of each respective arm of the U-shaped cavity of receiver 10. When sufficiently tightened, set screw 4 may immobilize and/or secure the longitudinal rod 6 within the U-shaped cavity of receiver 10.

Figure 2:
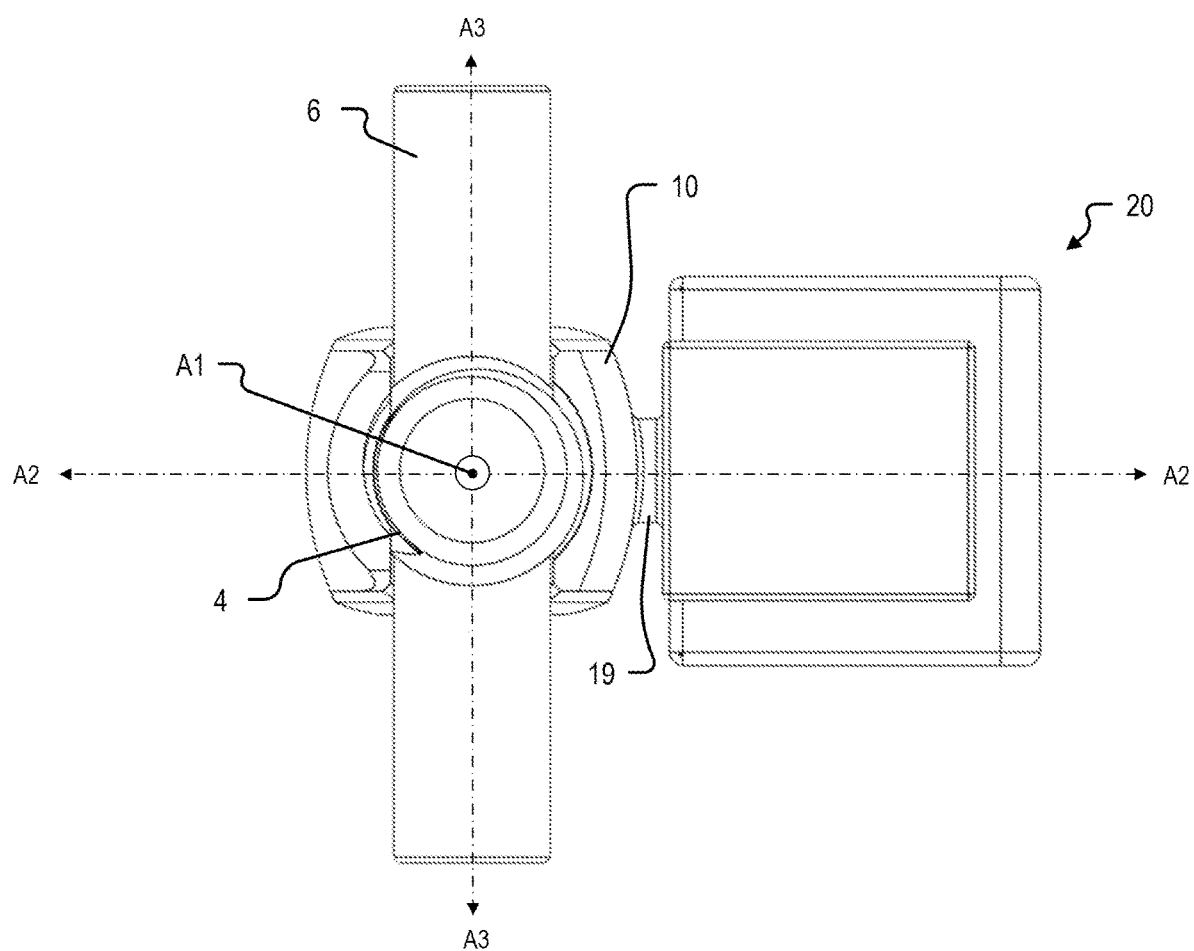
FIG. 2 is a top down view of the embodiment of FIG. 1.
Figure 3:
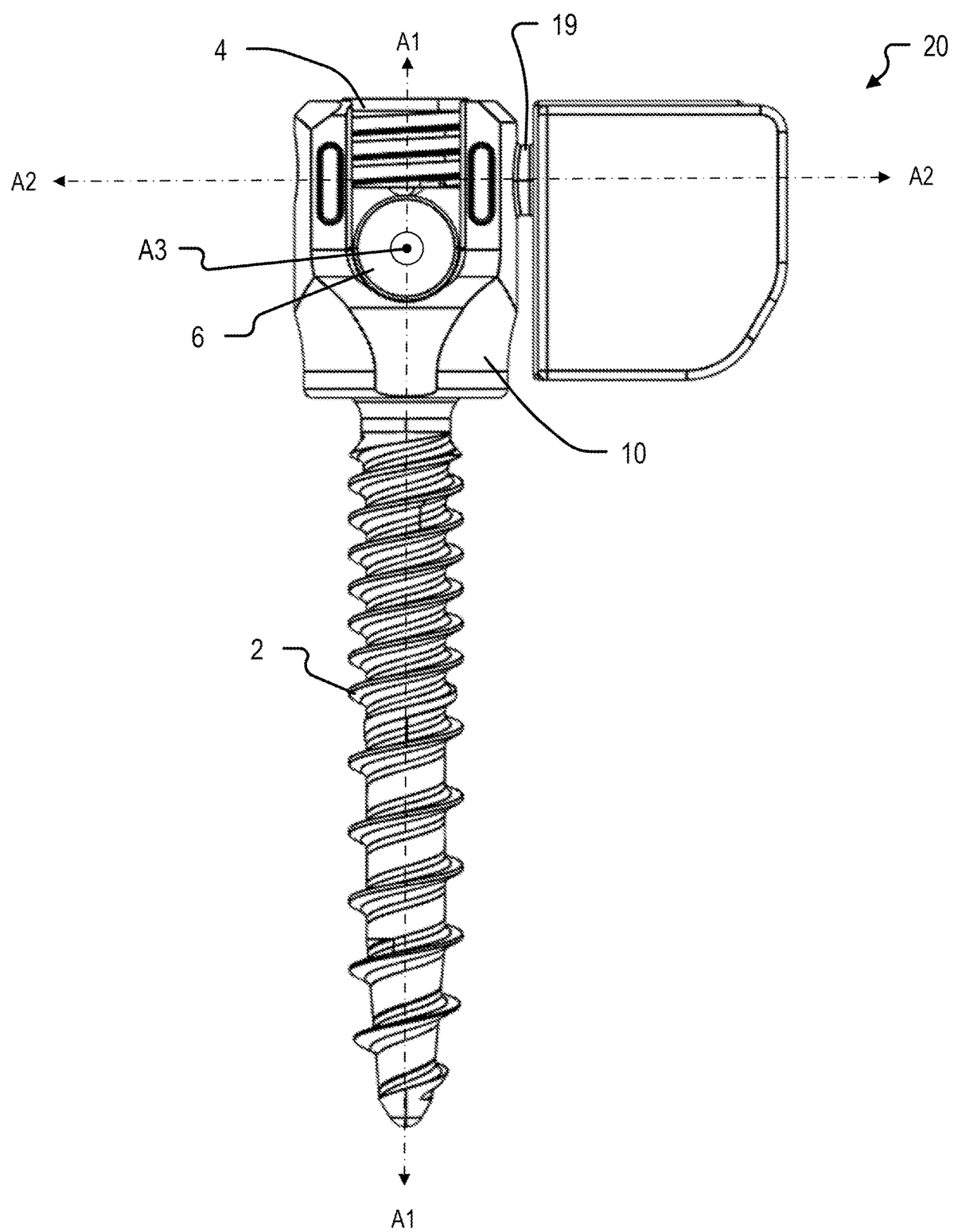
FIG. 3 is a first side view of the embodiment of FIG. 1.
Figure 4:
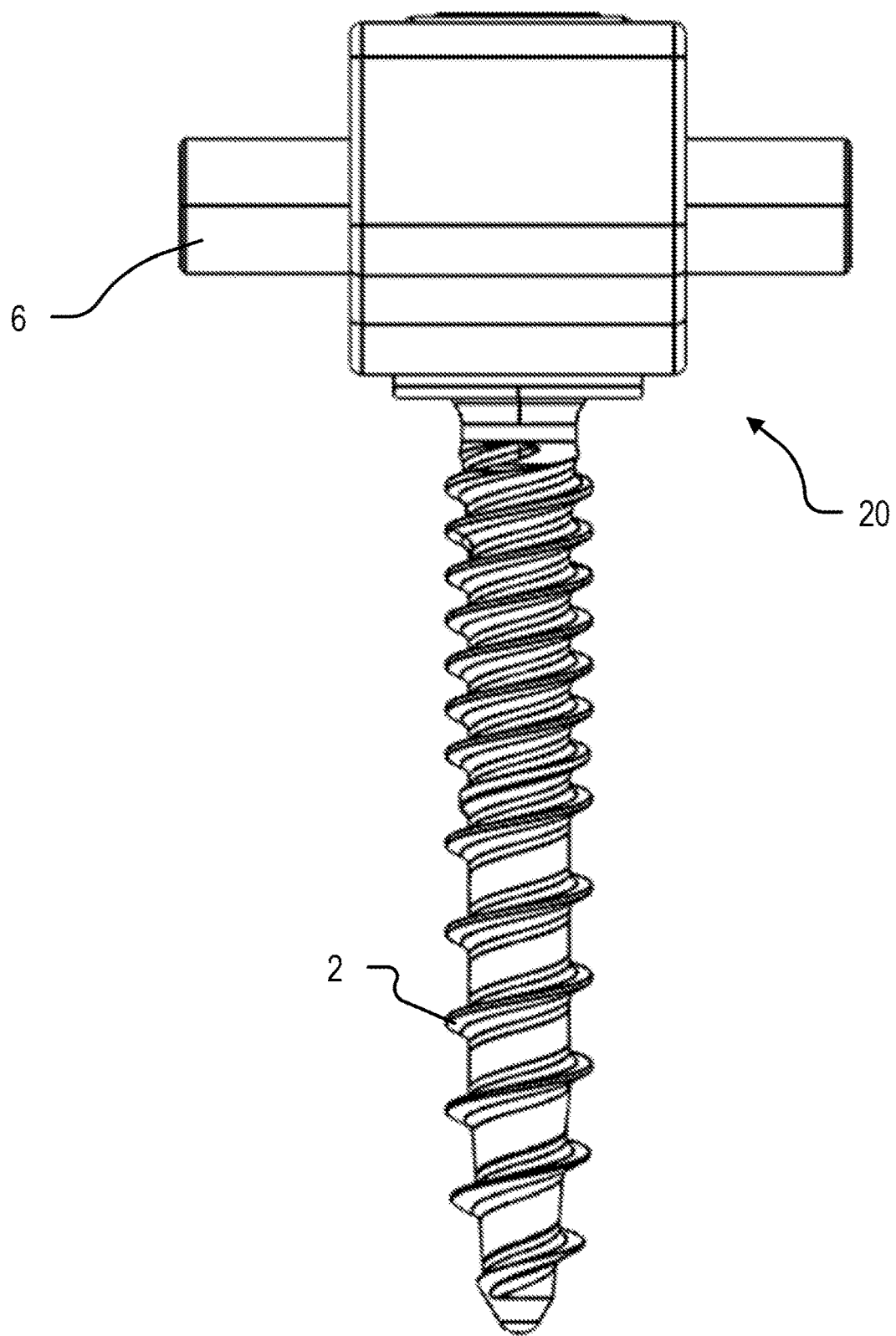
FIG. 4 is a second side view of the embodiment of FIG. 1.

Referring to FIGS. 2-4 generally, receiver 10 may be coupled to side portion 20 via a beam portion 19. In various embodiments, receiver 10 and side portion 20 may be monolithically formed as a single piece or receiver 10 and side portion 20 may be separable pieces that are connected together. In the example embodiment, receiver 10 and side portion 20 are monolithically formed and/or integrally formed together. For example, the receiver 10 is integrally formed with the side portion 20 and they are connected via beam portion 19. This arrangement may have the advantage of facilitating the transfer of stress and strain between the receiver 10 and side portion 20 as will be explained in further detail below.

With respect to a normal viewing angle shown in FIG. 3, the receiver 10 and side portion 20 may extend in a vertical direction parallel to axis A1 (a longitudinal direction), in a first horizontal direction parallel to axis A2 (a first widthwise direction), and in a second horizontal direction parallel to axis A3 (a second widthwise direction). For ease of explanation, the particular location of the Axes A1, A2, and A3 are illustrated as being centered with respect to various components of interest of system 100. For example, axis A1 may be centered in the vertical direction with respect to the U-shaped cavity of receiver 10 and define a rotation axis of set screw 4. Axis A2 may be centered in the first widthwise direction with respect to beam portion 19. Axis A3 may be centered in the second widthwise direction with respect to the arm portions of receiver 10 and define an extension axis of longitudinal rod 6.

Figure 5:
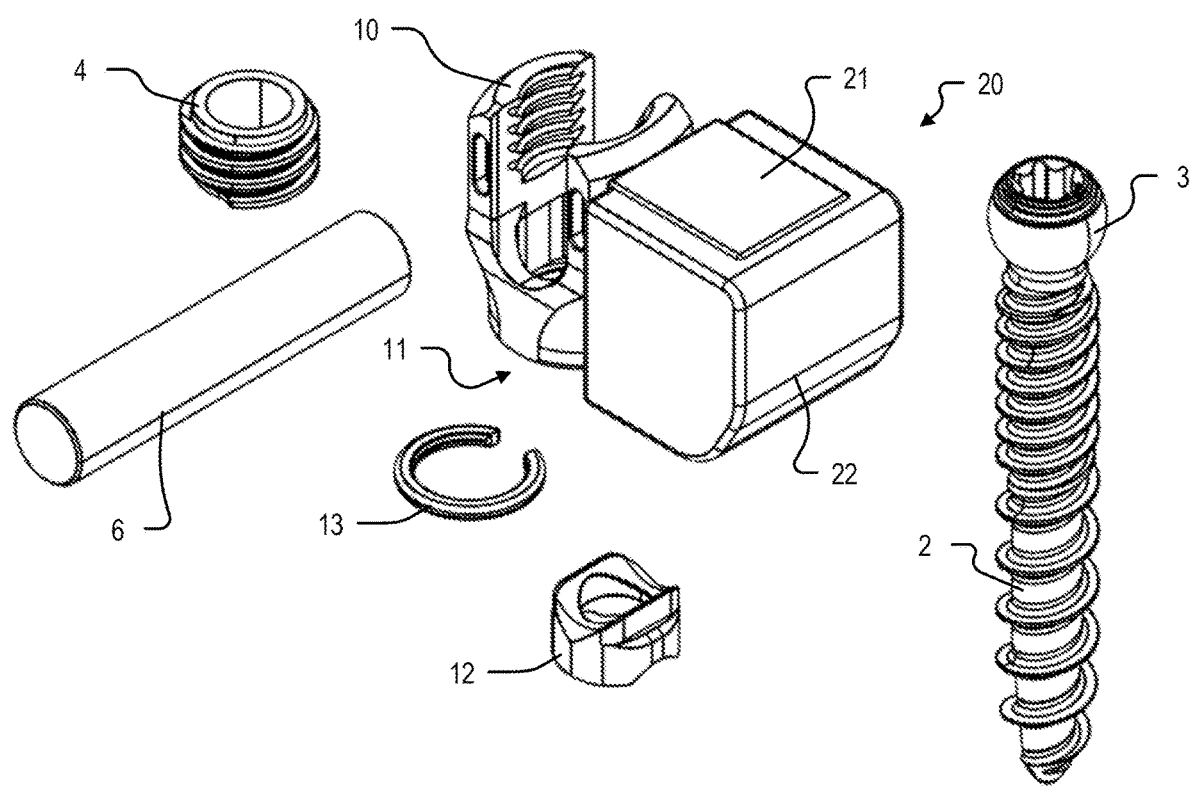
FIG. 5 is a first exploded parts view of the embodiment of FIG. 1.

FIG. 5 illustrates an exploded parts view showing the integrally connected receiver 10 and side portion 20 separated from the set screw 4, rod 6, washer/c-ring 13, saddle 12, and pedicle screw 2. In the example illustration, side portion 20 includes a housing 21 that forms a hermetically sealed cavity therein for housing various microelectronics and sensors. Some example sensors may include a strain sensor (also referred to as a stress gauge), accelerometer, gyroscope, temperature gauge, and impedance sensor.

In the example embodiment, the housing 21 is surrounded by a molded antenna portion 22. In the example embodiment, molded antenna has a U-like size and shape that generally corresponds to a size and shape of the housing 21. In various embodiments, the molded antenna 22 may include an overmold portion such as an insulator that surrounds and/or encapsulates a conductive material such as copper for forming an antenna capable of communicating across various frequency bands. In various embodiments, the insulator material may be a thermoplastic material like Polyether ether ketone (PEEK). The conductive portion may be formed in any suitable pattern, e.g., as a 3D helix pattern, a slotted patch pattern, a 3D spiral pattern, a 2D spiral, and/or a meandered patch pattern. In various embodiments, the molded antenna 22 may include an overmold portion that surrounds and/or supports at least one type of antenna therein. Various antenna and communication types housed within molded antenna 22 may be, for example, MICS and BLE. As used herein, "MICS" may refer to the Medical Implant Communication System which may be a short-range communication technology that operates at a frequency from about 402 to 405 MHz. As used herein, "BLE" may refer to Bluetooth low energy communication standard. In some embodiments, at least one patch style antenna may be disposed within the antenna portion 22, for example an overmold or insulator may surround a MICS patch, a BLE patch, and/or a Dual-band electrically coupled loop antenna (ECLA) antenna.

Figure 6:
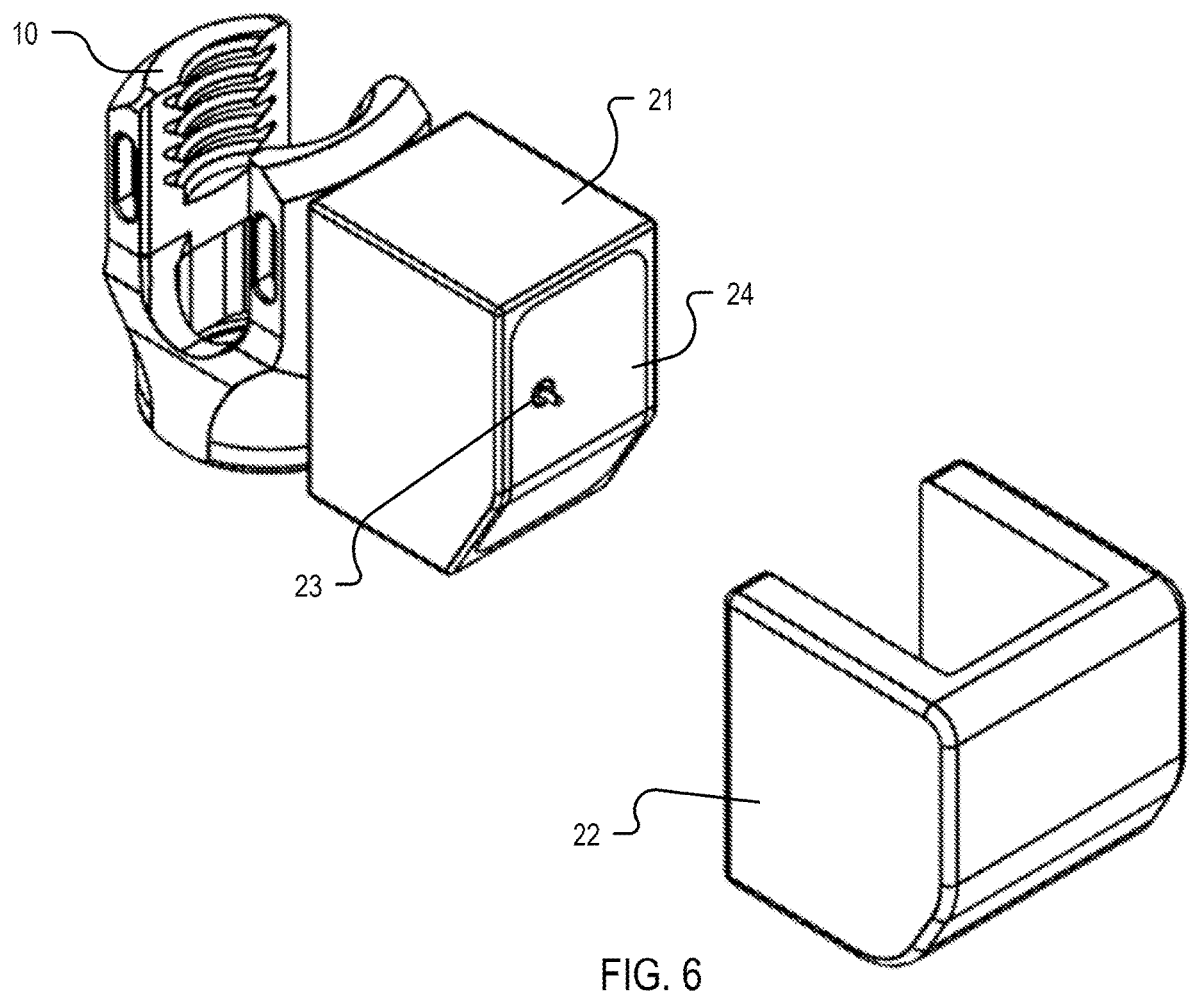
FIG. 6 is a second exploded parts view of a receiver portion and sensing components of the embodiment of FIG. 1.
Figure 7:
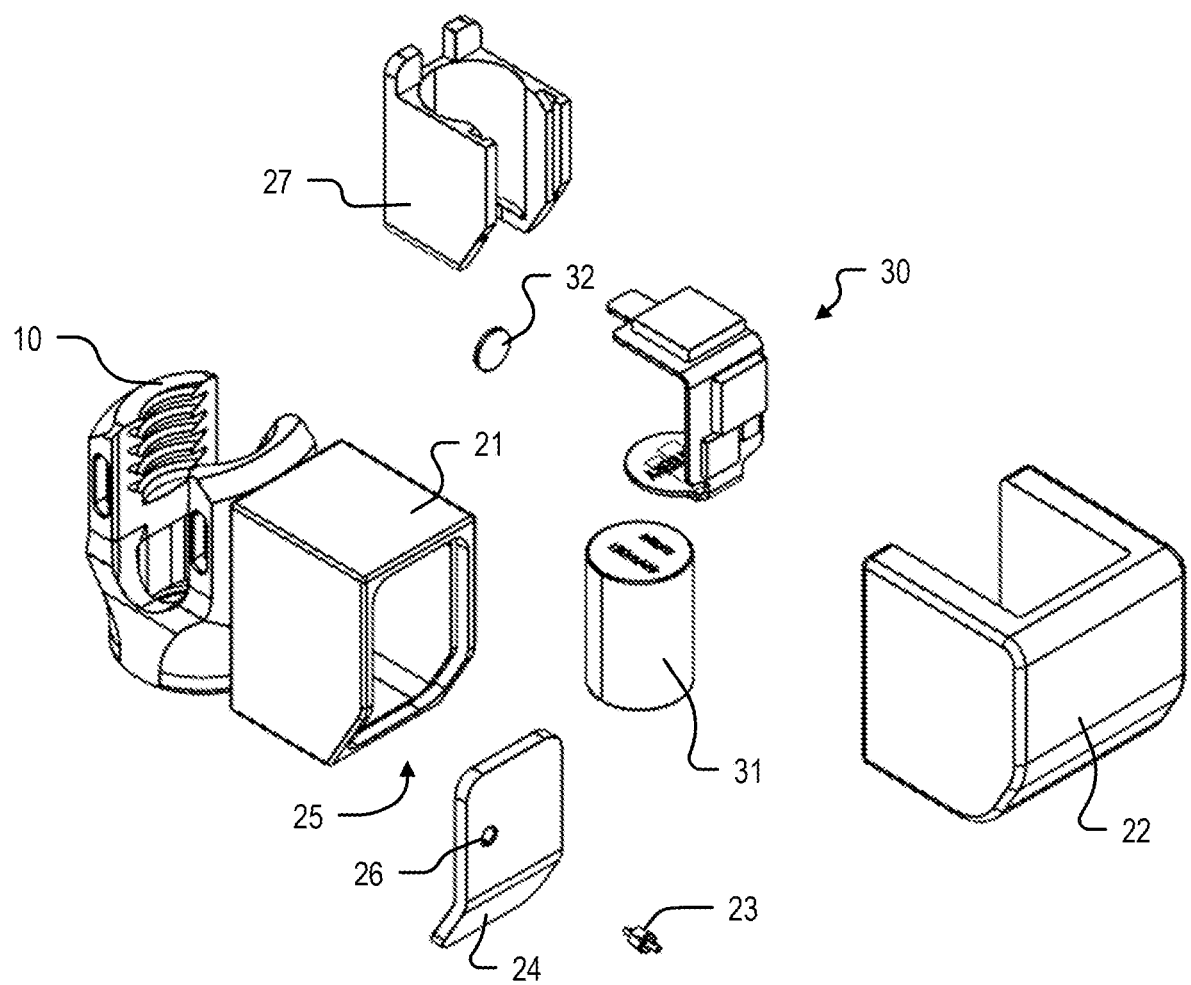
FIG. 7 is a third exploded parts view of the receiver portion and the sensing components of FIG. 6.

Referring to FIGS. 6-7, housing 21 may define a cavity 25 therein for supporting various electronic components assembled in a microelectronics assembly 30 and a battery 31. In various embodiments, cavity 25 of housing 21 may be hermetically sealed such that the microelectronics assembly 30 and battery therein will not harm a patient when the system 100 is installed within the human body. The battery 31 and microelectronics assembly 30 may be installed within the cavity 25 in any suitable way. In the example embodiment, frame 27 may support the battery 31 and microelectronics assembly 30 securely within the cavity such that the microelectronics, battery 31, strain gauge 32, and antenna portion 22 are electrically connected. In the example embodiment, the microelectronics assembly 30 and battery 31 may be disposed inside of the cavity 25 and the cavity 25 may be sealed off by cover 24. Cover 24 may have a size and shape corresponding to an opening in housing 21 that exposes the cavity 25 therein. Due to the hermetically sealed nature of cavity 25, a pass-through connection 23 having suitable waterproof flanges may extend through an aperture 26 of cover 24 (see FIG. 6). In this way, the pass-through connection 23 may be electrically connected to the microelectronics assembly 30 and the antenna portion 22 while ensuring that a hermetic seal of the electronics components is possible.

Figure 8:
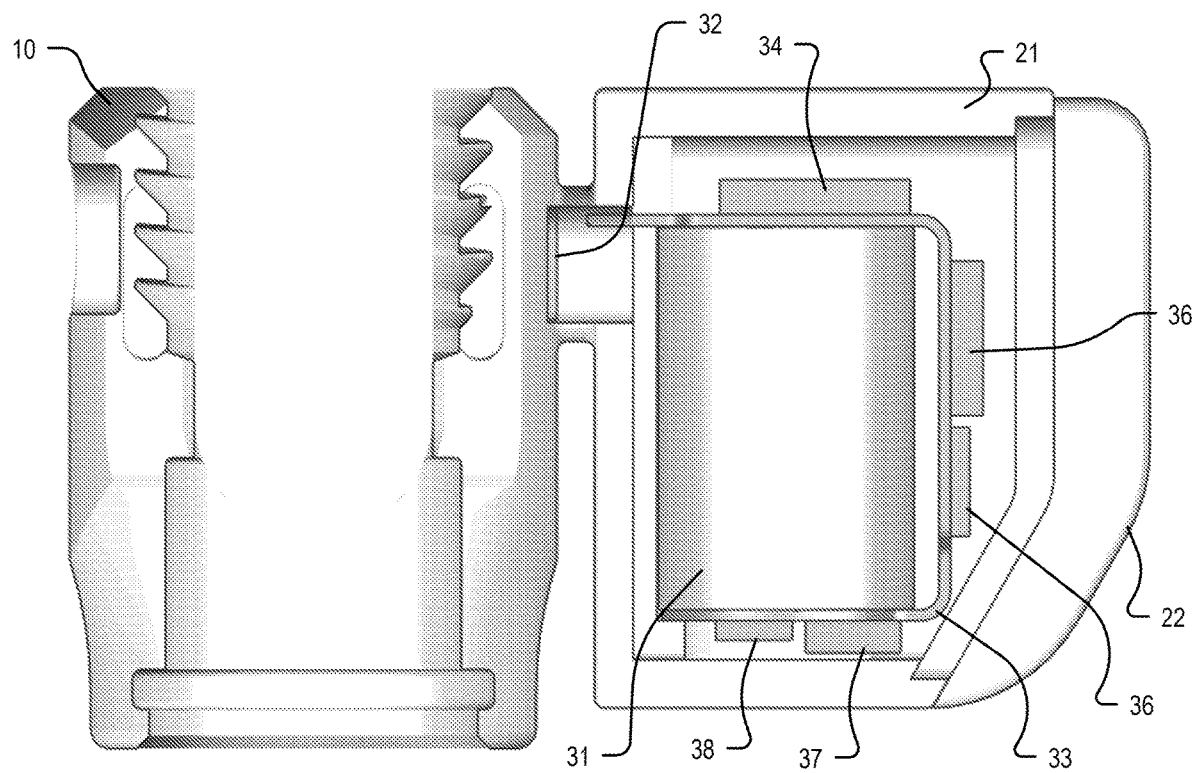
FIG. 8 is a head on cross section drawing of the receiver portion and sensing components of the embodiment of FIG. 1.
Figure 9:
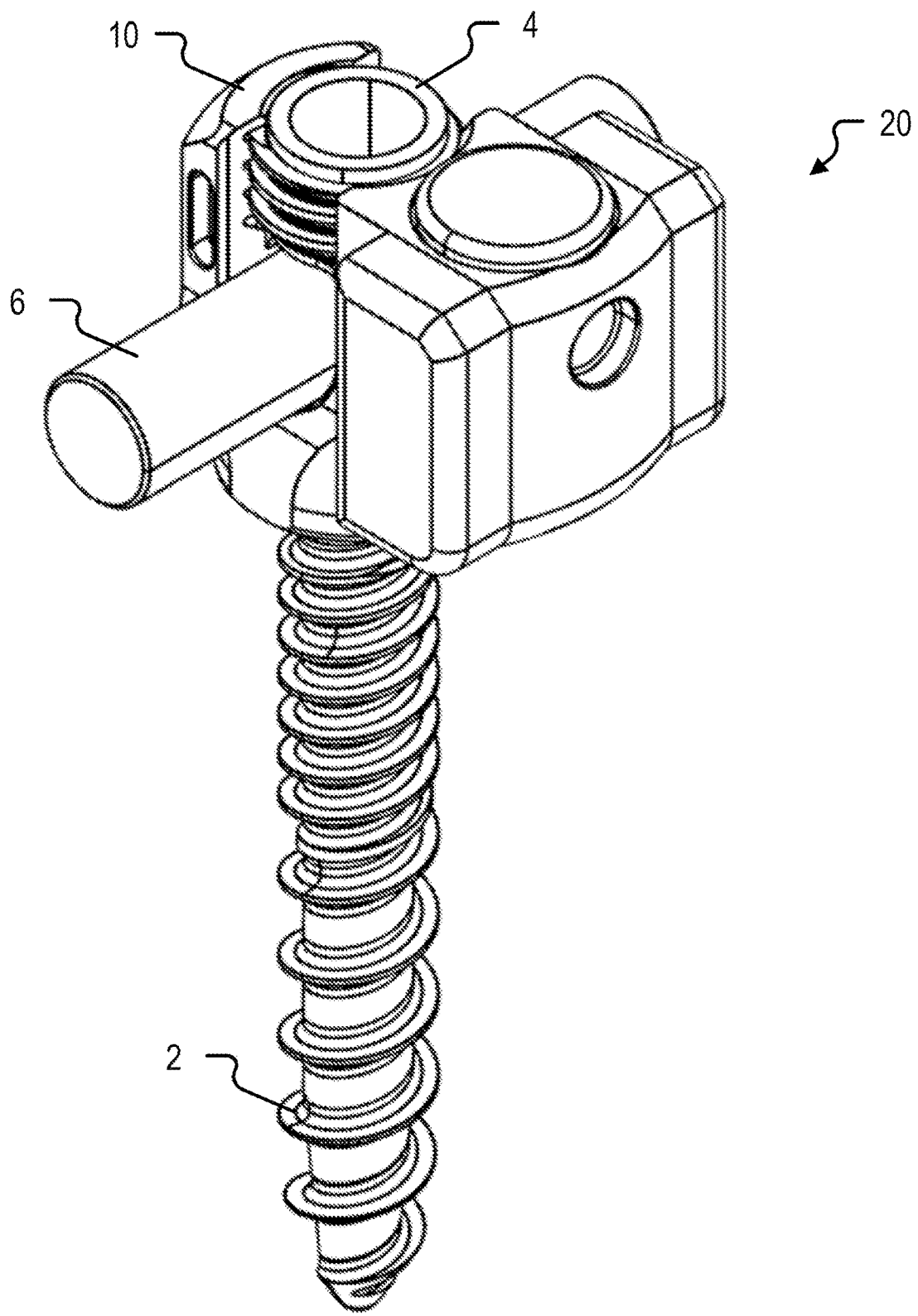
FIG. 9 is a perspective view of a second embodiment of a pedicle screw system.
Figure 10:
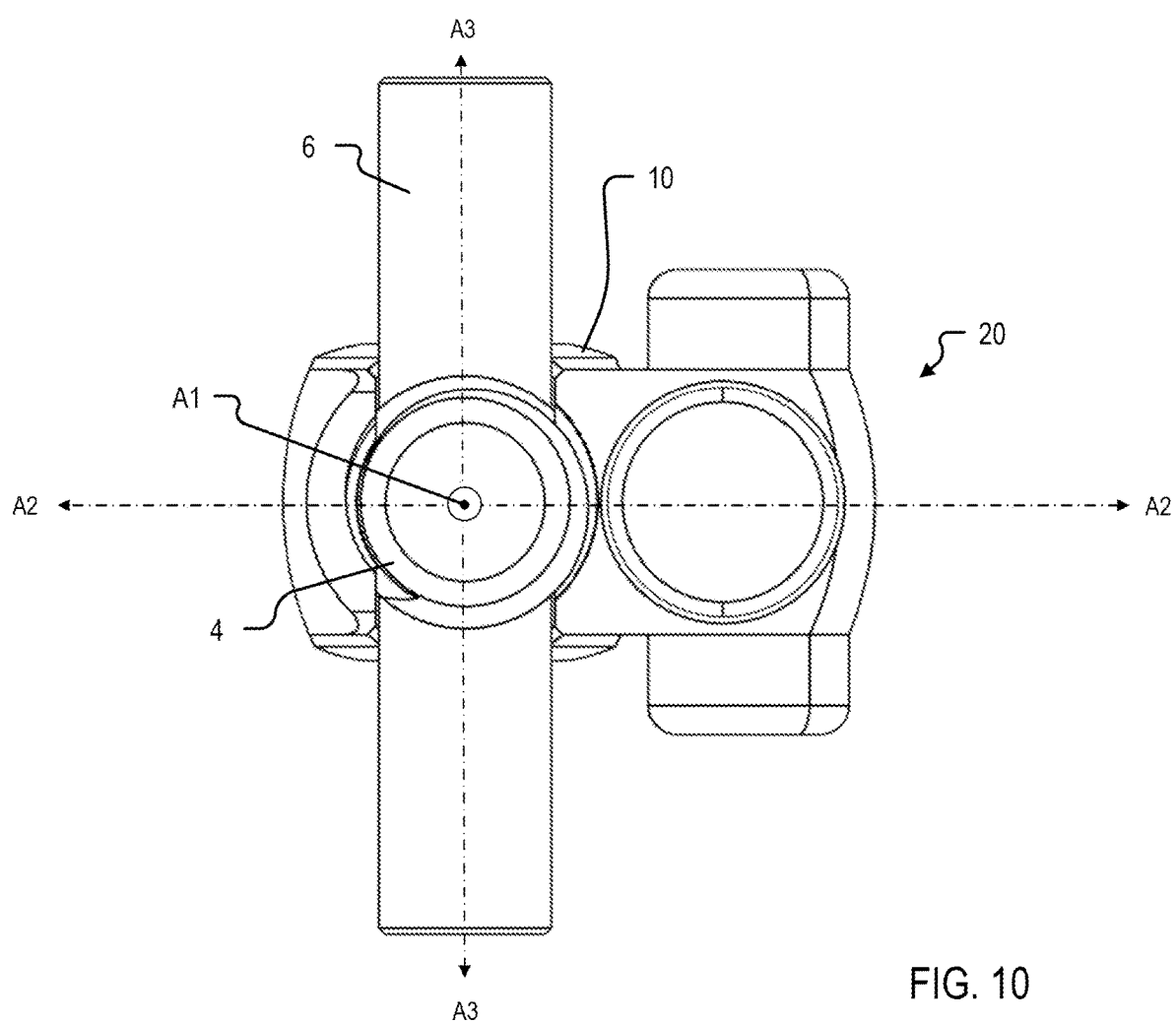
FIG. 10 is a top down view of the embodiment of FIG. 10.

As seen best in FIG. 8, a portion of the cavity 25 may extend into and/or otherwise communicate with a second cavity 29 inside of beam portion 19. In the example embodiment, beam portion 19 may include a second cavity 29 for disposal of a strain gauge 32 therein. As used herein, a strain gauge may refer to one or more sensors or sensor nodes that measure strain, force, resistance, deflection, load and/or the like. In various embodiments, second cavity 29 be a cylindrical cavity and strain gauge 32 may have a circular shape that corresponds to a diameter of the cylindrical cavity. For example, a cross section diameter of strain gauge 32 may corresponds to a cross section diameter of second cavity 29. Other embodiments may have some variability in size and proportions. As explained previously, beam 19 functions as an isolation beam that effectively transfers and isolates stress and strain of receiver 10. In this way, the position of strain gauge 32 within the isolation beam 19 disposes strain gauge 32 in a region adjacent to the sidewall of receiver 10. For example, strain gauge 32 is disposed in a region against receiver 10 that, absent isolation beam 19, would correspond to the outer sidewall of receiver 10. In various embodiments, the location of strain gauge 32 in the vertical direction may also correspond to the bottom of set screw 4 when the set screw 4 is tightened against the longitudinal rod 6. In this way, strain gauge 32 may positioned at a region that can effectively measure a force between the set screw 4 and the longitudinal rod 6 when the set screw 4 is engaged with the receiver 10.

In various embodiments, one or more measurements obtained by strain gauge 32 may be stored by an integrated circuit of a corresponding load sensing assembly such as, for example, in non-transitory computer readable memory storage 37 disclosed above. In this way, the system 100 may be continuously powered by the battery 31 and obtain measurements over time. In some embodiments, the system 100 may "wake-up" at predetermined time periods to record various data points at predetermined time intervals. For example, the system 100 may be programmed to wake up at one-hour intervals, two hour intervals, etc. and record various data points to the memory storage 37. In this way, the power of the battery 31 may be preserved.

In various embodiments, an antenna housed in the antenna portion 22 and/or wake up sensor 36 may be interrogated by a reader (not illustrated) which may cause the transmission of data stored in the memory storage 37. In this embodiment, system 100 may not continuously transmit data stored in the memory storage 37, but rather may only transmit data stored in the memory storage 37 when interrogated by a reader. For example, transmission of data may occur in response to being interrogated by the reader, or the transmission may be initiated at timed intervals. In various embodiments, the reader may receive the transmitted measurements, which may be displayed to a user such as a physician. Example readers may include at least one antenna for receiving and/or transmitting data across a suitable bandwidth and protocol similar to or the same as antenna portion 22. A reader may also include a central processing unit CPU, and a non-transitory computer readable medium (such as a memory unit or memory cell storing programmable computer implemented instructions).

As also seen in FIG. 8, the microelectronics assembly 30 may have great variability in the types of circuitry and hardware due to the relatively large size of the side portion 20 and cavity 25. Example electronics components may include a flexible circuit board 33 providing an electrical connection between the battery 31, strain gauge 32, and the various other electronics components. A non-limiting list of example electronics components may include an Application Specific Integrated Controller (ASIC) 34, micro controller 35, a wake-up sensor 36, a memory storage 37, and a temperature sensor 38.

In various embodiments the memory storage 37 may be a non-transitory memory data store that may store information and/or data from various sensors and electronics components, for example. For example, one or more measurements of a strain gauge 32 may be stored in memory storage 37. As another example, a unique identifier associated with a load sensing assembly, a component thereof, or a set screw 4 may be stored in memory. One or more measurements received from strain gauge 32 may be used to make determinations of the condition of system 100 and/or treatment of a spinal disorder. For instance, proper placement of a longitudinal member 6, set screw 4 and/or pedicle screw 2 may result in an acceptable range of force measurements collected by a strain gauge 32. Measurements outside of this range may indicate a problem with the placement or positioning of the longitudinal member 6, set screw 4 and/or pedicle screw 2. For example, loosening of a critical component, construct failure, yield or fracture/breakage, improper torque, breakage of the bone segment or portion, the occurrence of fusion or amount of fusion, and/or the like.

FIGS. 9-19 illustrate a second digital pedicle screw system 200. The second digital pedicle screw system 200 may include the same, similar, and/or substantially the same features, components, and functionality as explained above with respect to first digital pedicle screw system 100 and vice versa. Accordingly, duplicative description will be omitted where feasible and like numbering will be used where possible.

As illustrated in FIGS. 9-12, system 200 may include a pedicle screw 2 and a receiver 10 having a side portion 20 for supporting various electronic components and sensors. In various embodiments, receiver 10 and side portion 20 may be monolithically formed as a single piece component. This arrangement may have the advantage of facilitating the transfer of stress and strain between the receiver 10 and side portion 20.

Figure 11:
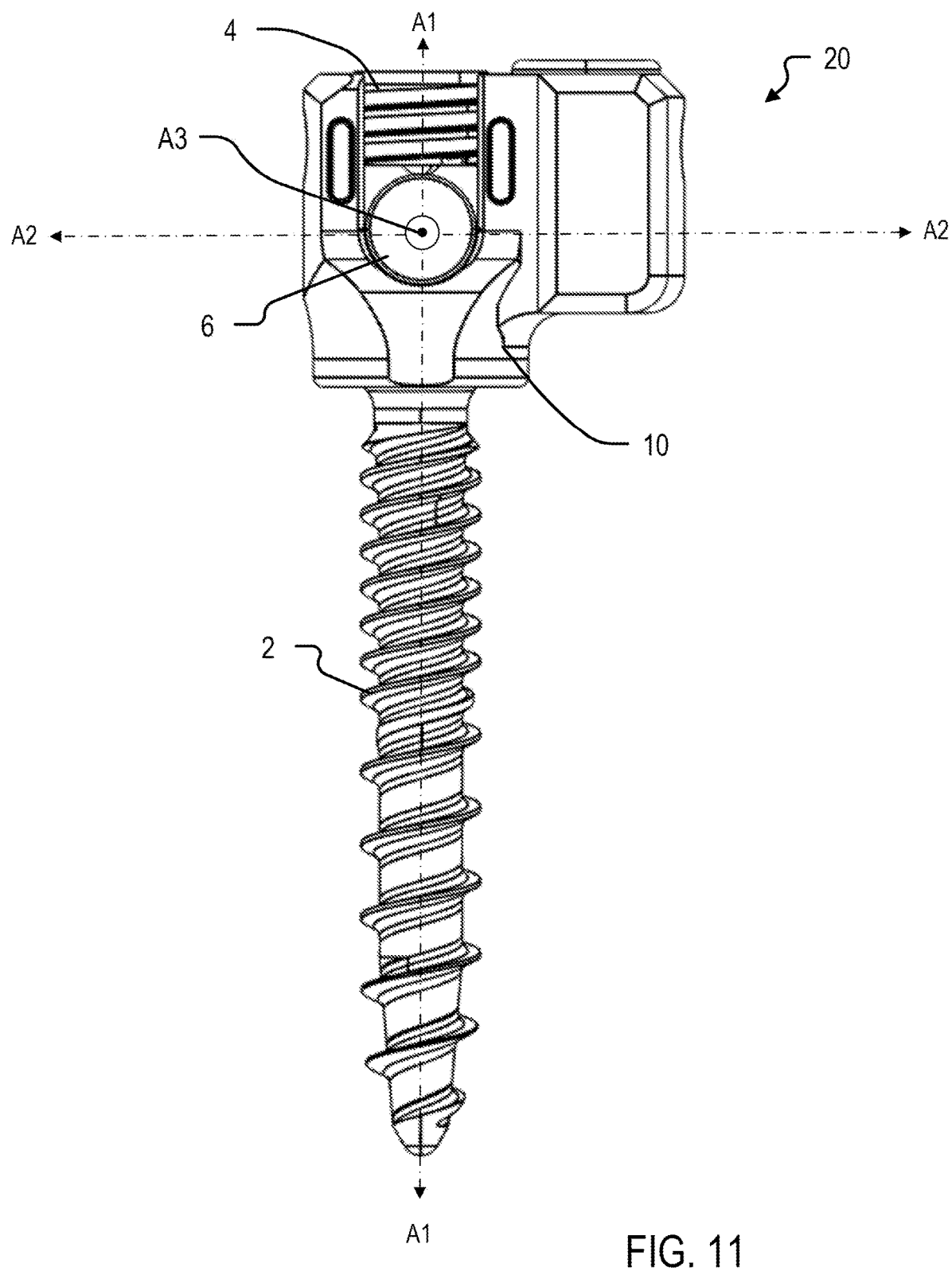
FIG. 11 is a first side view of the embodiment of FIG. 10.
Figure 12:
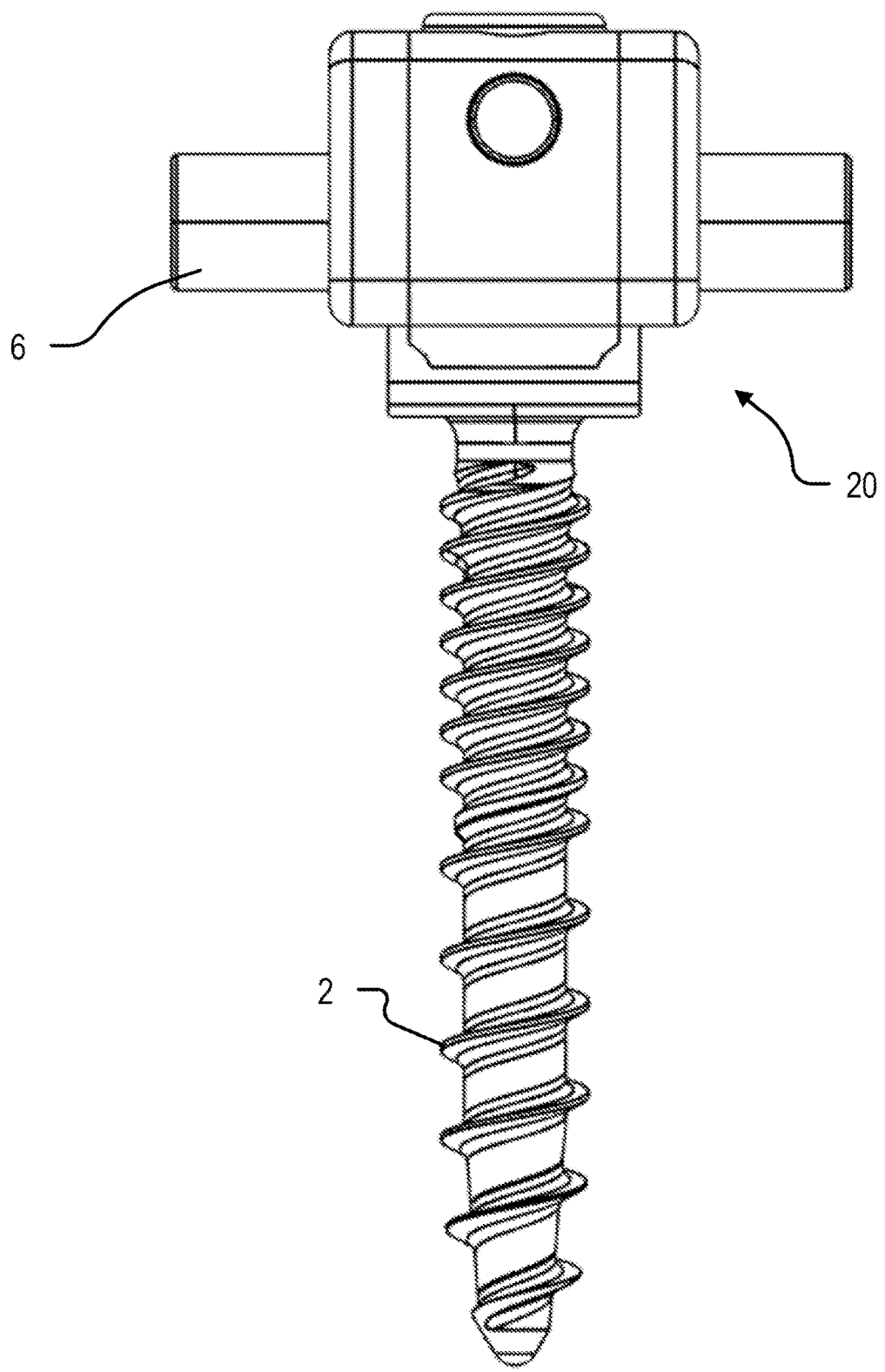
FIG. 12 is a second side view of the embodiment of FIG. 10.

With respect to a normal viewing angle shown in FIG. 11, the receiver 10 and side portion 20 may extend in a vertical direction parallel to axis A1 (a longitudinal direction), in a first horizontal direction parallel to axis A2 (a first widthwise direction), and in a second horizontal direction parallel to axis A3 (a second widthwise direction). For ease of explanation, the particular location of the Axes A1, A2, and A3 are illustrated as being centered with respect to the portion of longitudinal rod 6 that is directly beneath set screw 4. For example, axis A1 may be centered in the vertical direction with respect to the U-shaped cavity of receiver 10 and define a rotation axis of set screw 4. Axis A2 may be centered in the first widthwise direction and intersect with Axis A1 at a CenterPoint of the longitudinal rod 6. Axis A3 may be centered in the second widthwise direction with respect to the arm portions of receiver 10 and define an extension axis of longitudinal rod 6.

Figure 13:
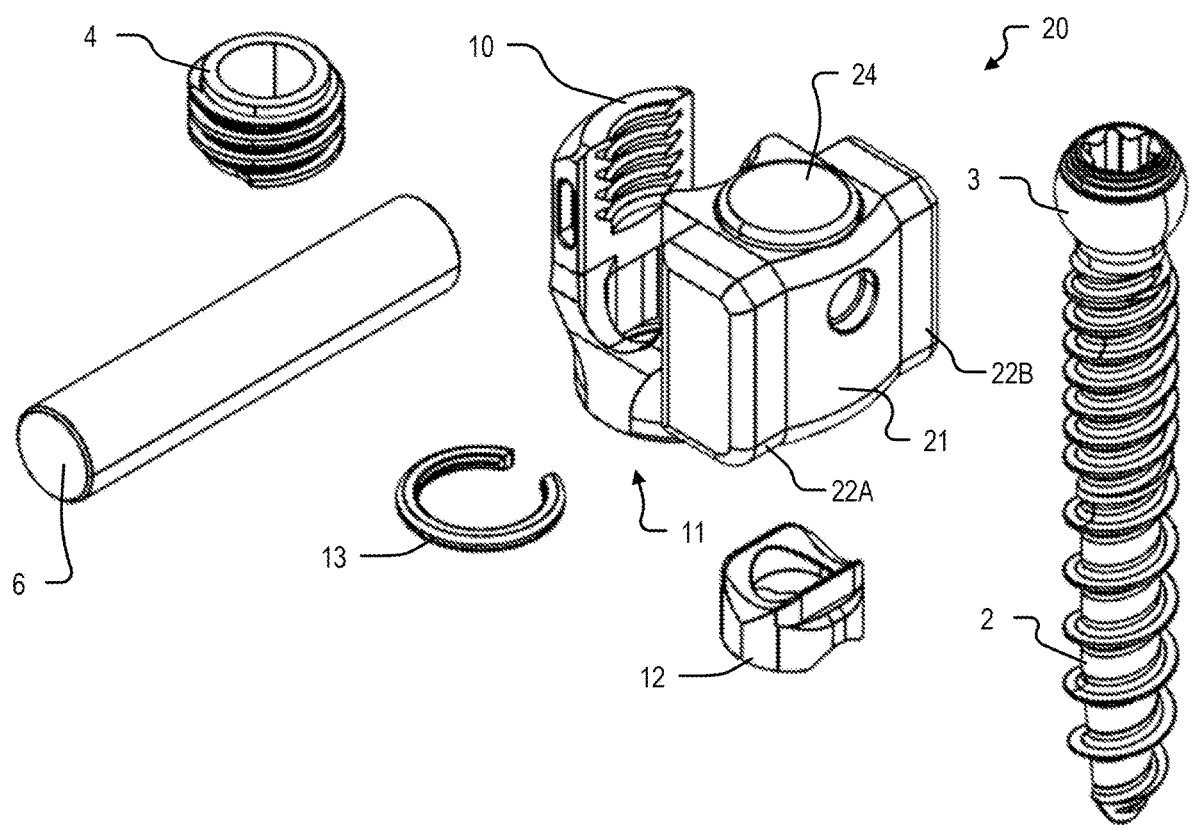
FIG. 13 is a first exploded parts view of the embodiment of FIG. 10.

FIG. 13 illustrates an exploded parts view showing the integrally connected receiver 10 and side portion 20 separated from the set screw 4, rod 6, washer 13, saddle 12, and pedicle screw 2. In the example illustration, side portion 20 includes a housing 21 that forms a hermetically sealed cavity therein for housing various microelectronics and sensors.

Figure 14:
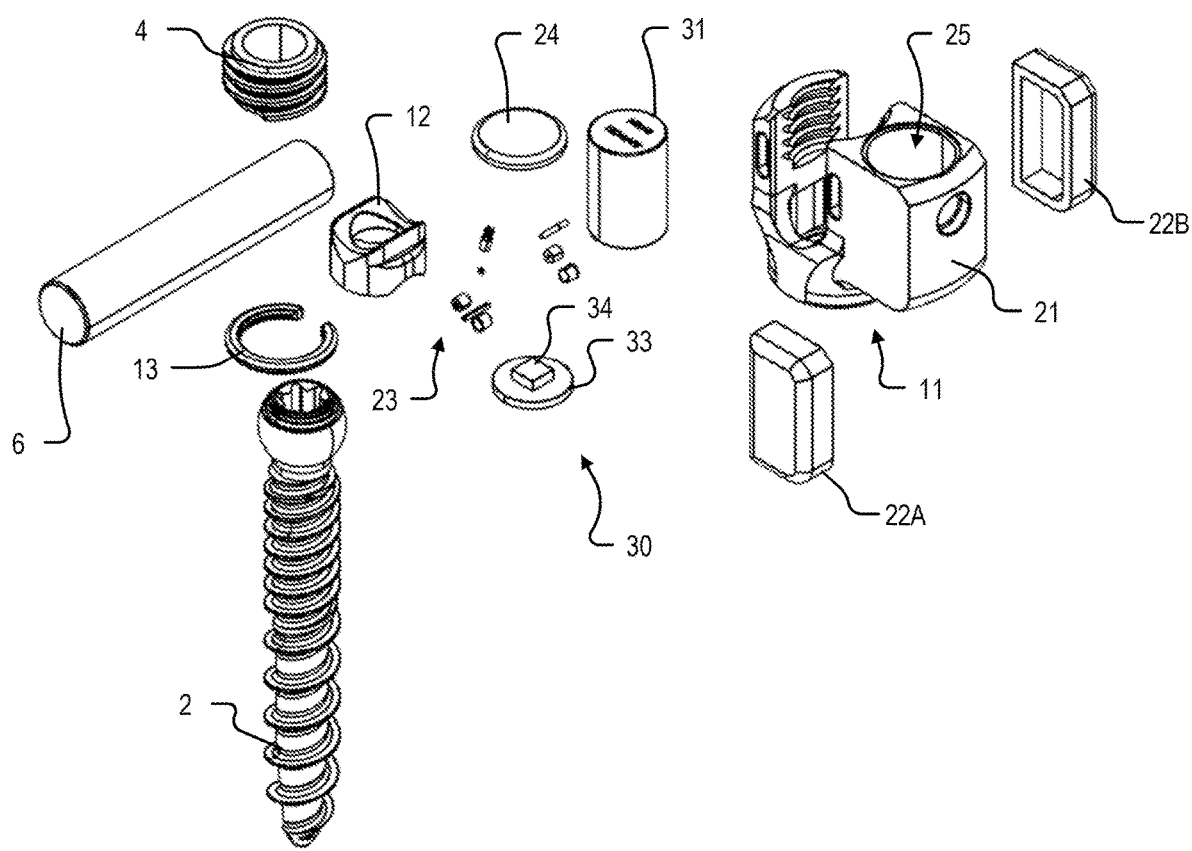
FIG. 14 is a second exploded parts view of the embodiment of FIG. 10.
Figure 15:
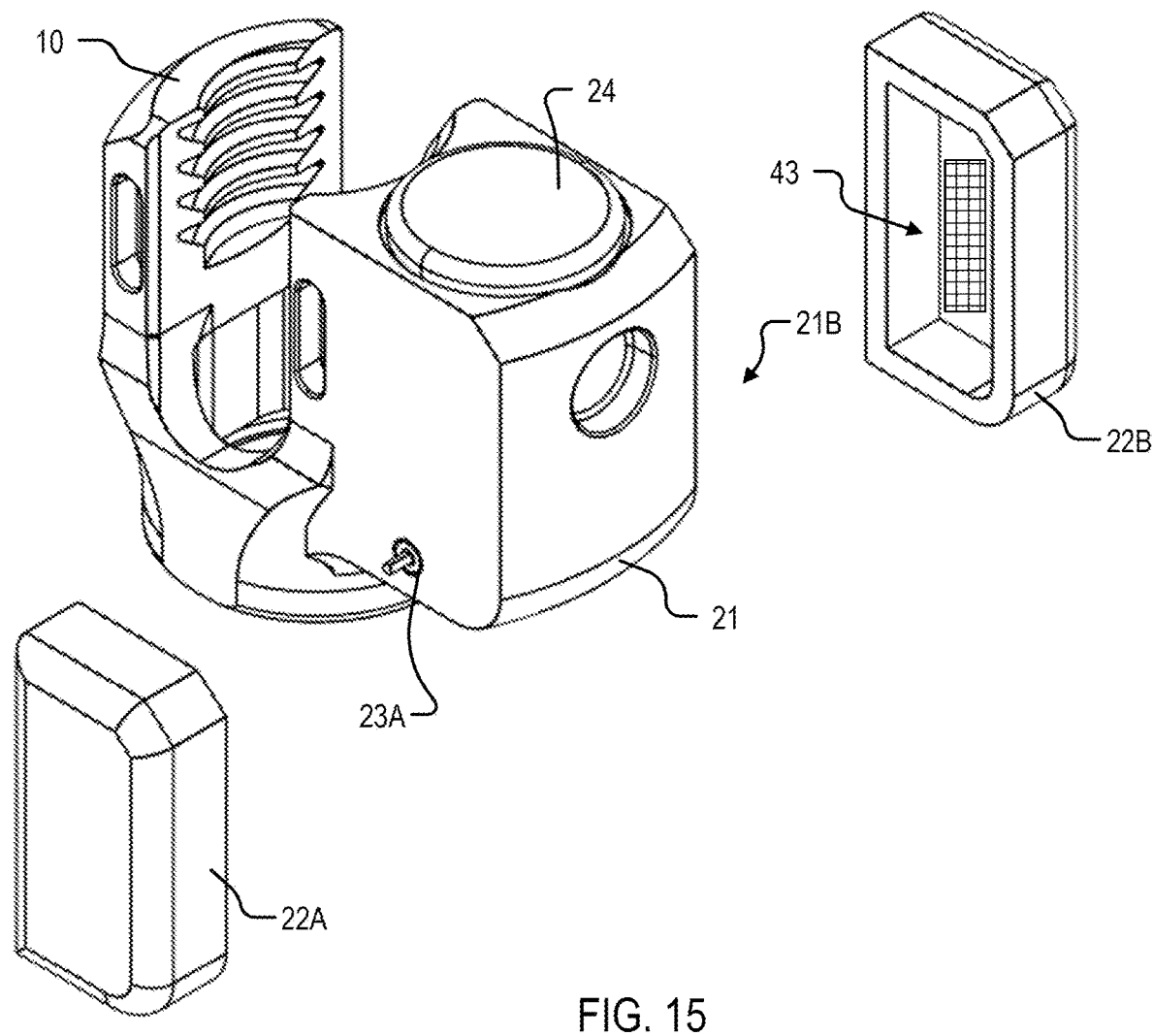
FIG. 15 is a third exploded parts view of a receiver portion and sensing components of the embodiment of FIG. 10.
Figure 16:
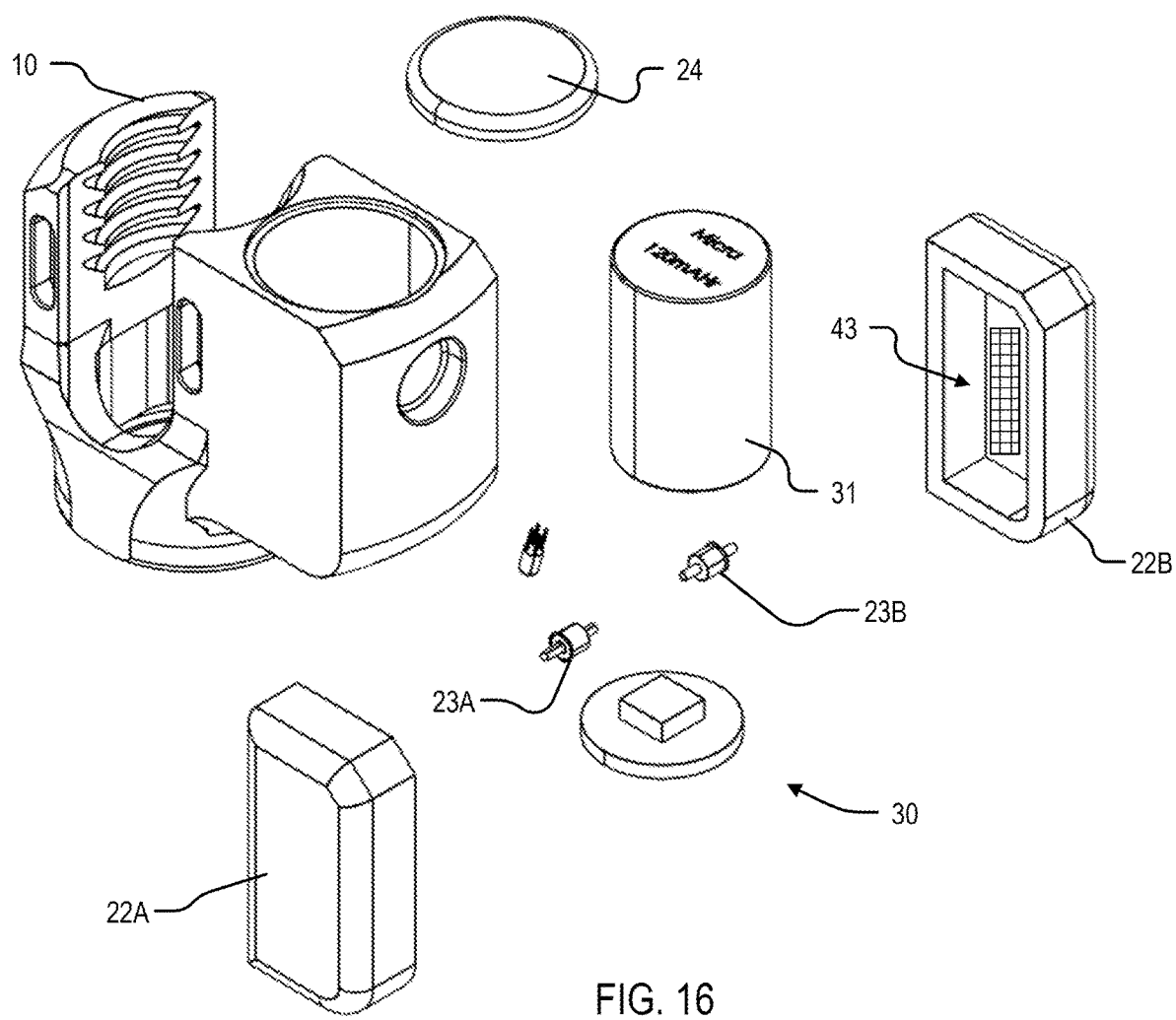
FIG. 16 is a fourth exploded parts view of the receiver portion and the sensing components of FIG. 16.

Referring to FIGS. 14-16, housing 21 may define a cavity 25 therein for supporting various electronic components of the microelectronics assembly 30 and a battery 31. In various embodiments, cavity 25 of housing 21 may be hermetically sealed. The battery 31 and microelectronics assembly 30 may be installed within the cavity 25 in any suitable way such that the microelectronics, battery 31, strain gauge 32, and at least one antenna portion 22A, 22B are electrically connected. In the example embodiment, the microelectronics assembly 30 and battery 31 may be disposed inside of the cavity 25 and the cavity 25 may be sealed off by cover 24. In this embodiment, cover 24 is a circular plate that is dimensioned to cover a corresponding opening in the top portion of housing 21. Additionally, in this embodiment, a first antenna portion 22A is disposed on a first sidewall 21A of housing 21 and a second antenna portion 22B is disposed on a second sidewall 21B of housing 21. For example, the first antenna portion 22A is disposed on an opposite sidewall of the housing 21 opposite the second antenna portion 22B. In this embodiment, the antenna portions 22A and 22B include a corresponding cavity for housing any suitable type of antenna 43, e.g., a grid antenna or a patch antenna 43 and/or any combination of antennas as explained previously. In some embodiments, each cavity of the antenna portions 22A, 22B may house different types of antenna having different communication frequencies and protocols.

As seen best in FIG. 15 a first pass-through connection 23A having suitable waterproof flanges may extend through first sidewall 21A and a second pass-through connection 23B having suitable waterproof flanges may extend through second sidewall 21B. In this way, the pass-through connections 23A and 23B may be electrically connected to the microelectronics assembly 30 and the antenna portions 22A, 22B while ensuring that a hermetic seal of the electronics components is possible.

Figure 17:
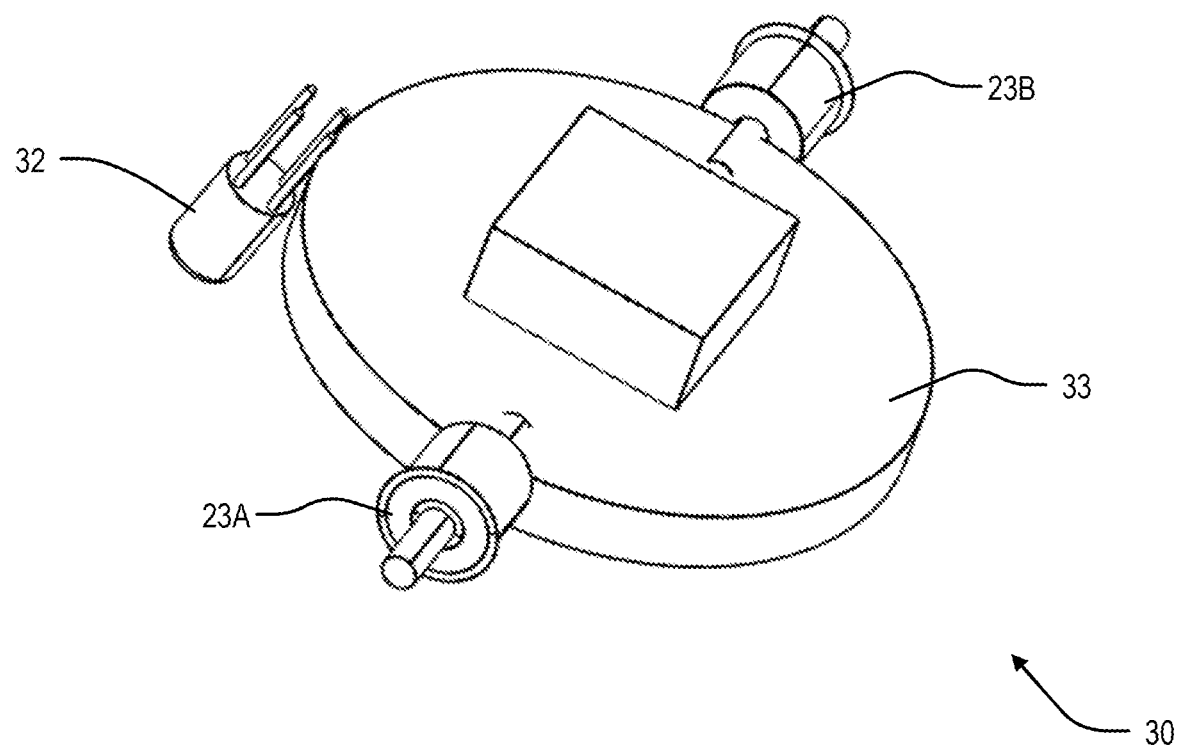
FIG. 17 is a perspective view of a strain gauge and microelectronics sub-assembly.
Figure 18:
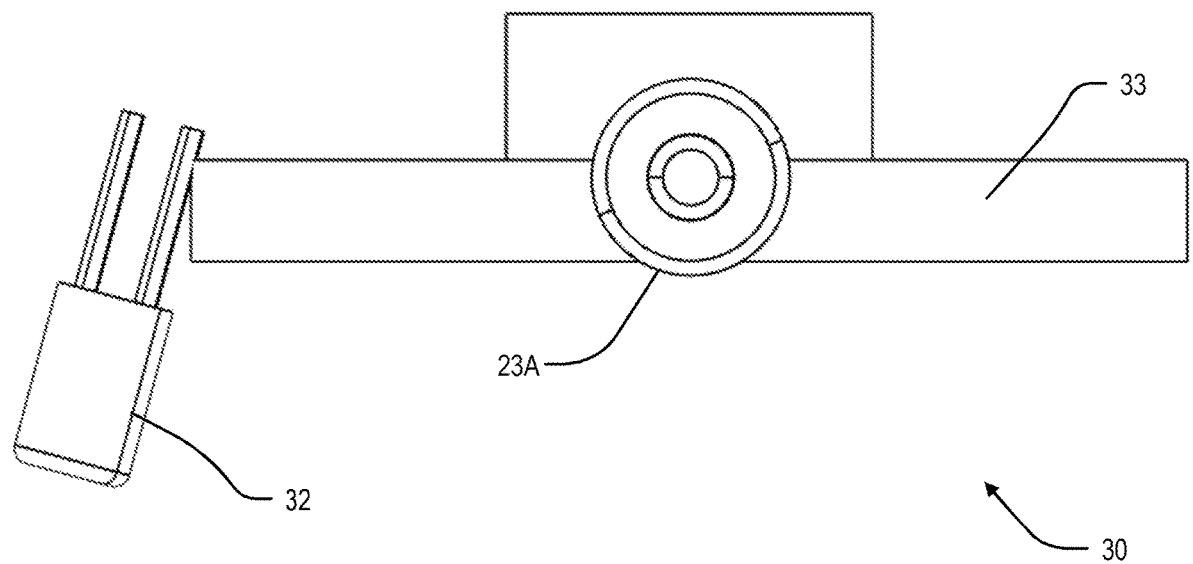
FIG. 18 is a side view of view of a strain gauge and microelectronics sub-assembly.

FIG. 17 is a perspective view of a strain gauge 32 and microelectronics assembly 30 and FIG. 18 is a side view of view of a strain gauge 32 and microelectronics assembly 30. In the example embodiment, the strain gauge 32, and pass through connections 23A, 23B are electrically connected to a flexible circuit board 33 which can be in electrical communication with any of the previously explained microelectronics components.

Figure 19:
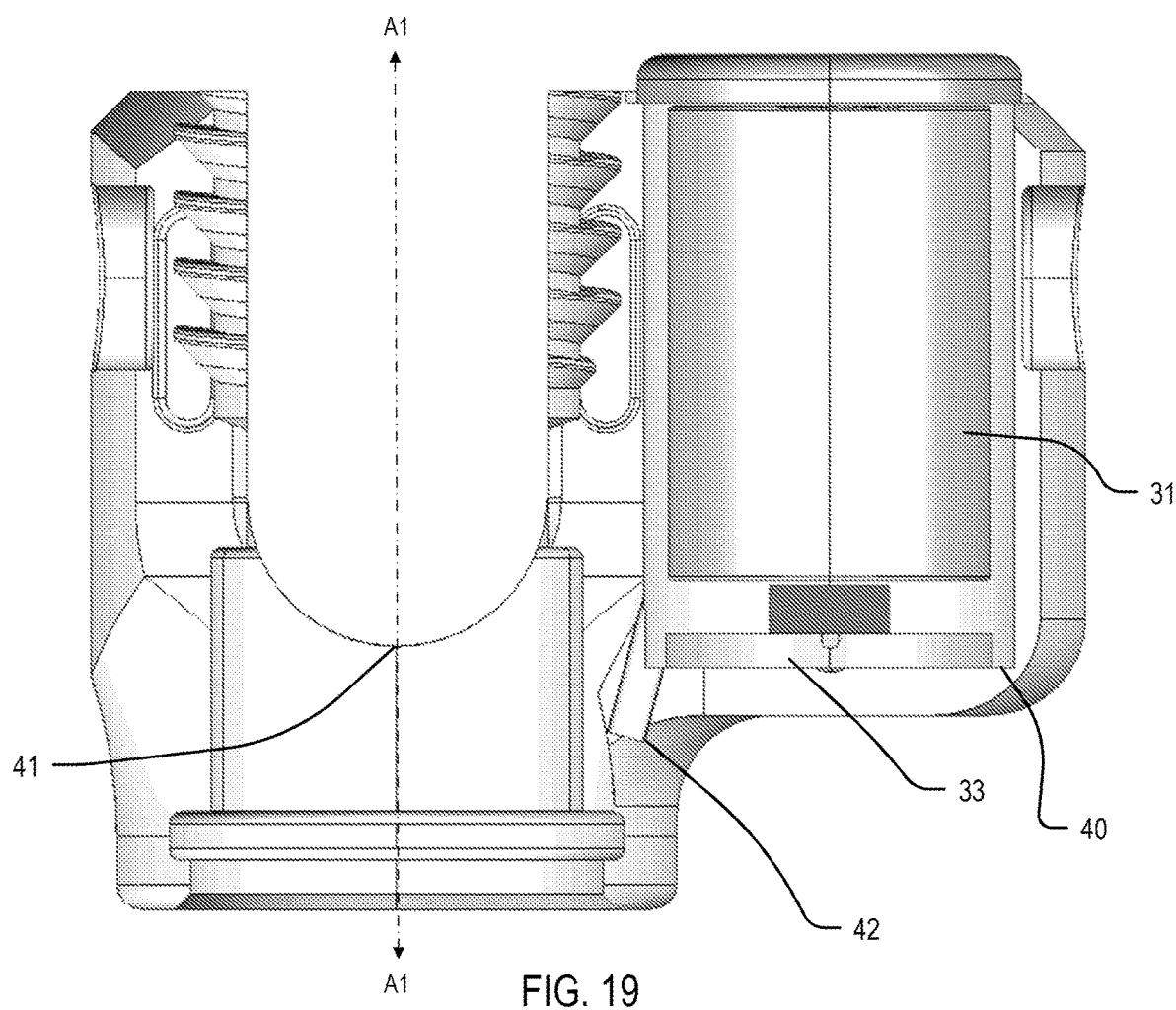
FIG. 19 is a head on cross section drawing, with some parts removed, of the receiver portion and sensing components of the embodiment of FIG. 9.
Figure 20:
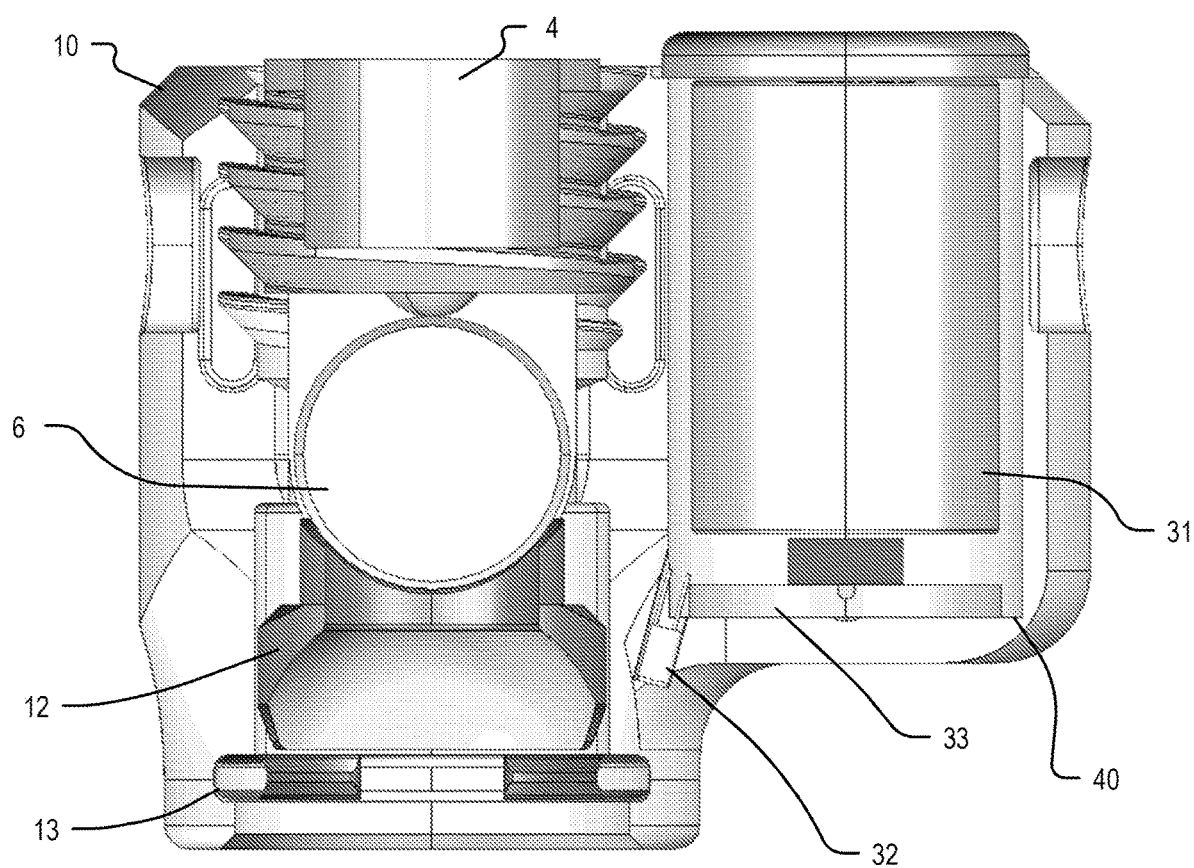
FIG. 20 is a head on cross section drawing of an assembled receiver illustrating the relative height and relationship with the longitudinal rod.

As seen best in the partial parts cross section drawing of FIG. 19, a second cavity 42 for orienting and supporting the strain gauge 32 is disposed adjacent to a curved bottom surface 41 of the U-shaped cavity. Additionally, the second cavity 42 extends through a bottom surface 40 of the first cavity 25. For example, the second cavity 42 adjoins and/or otherwise communicates with the first cavity 25. In the example embodiment, the second cavity 42 may be a cylindrical shaped cavity that is oriented at an angle ranging between 90 degrees and 180 degrees with a bottom surface of the first cavity 25 and more particularly about 95 degrees to about 115 degrees. As seen best in the assembled parts cross section drawing of FIG. 20, it is shown that the strain gauge 32 and second cavity 42 are disposed in an optimal position for detecting stress and strain transferred between the set screw 4, rod 6, and receiver 10. For example, the strain gauge 32 is disposed within cavity 42 in a region that is at an elevation just below the longitudinal rod 6. For example, the strain gauge 32 is disposed within a cavity at a first height that is below a lowermost surface of the longitudinal rod 6. For example, in the vertical direction, the strain gauge is disposed at an elevation that is below the longitudinal rod. Additionally, in the vertical direction, the strain gauge 32 is approximately aligned with a threaded portion 44 of one of the arms of receiver 10 that define the U-shaped cavity. In testing, Applicant has determined that placement of the strain gauge 32 is critical because different placements of the strain gauge 32 can lead to drastically different measurement readings and accuracy. The particular placement of strain gauge 32 shown in the example embodiments of system 200, has been shown to yield significantly more accurate and sensitive readings of the stress strain relationship between the longitudinal rod 6, set screw 4, receiver 10, and pedicle screw 2.

It should be understood that various aspects disclosed herein may be combined in different combinations than the combinations specifically presented in the description and accompanying drawings. For example, features, functionality, and components from one embodiment may be combined with another embodiment and vice versa unless the context clearly indicates otherwise. Similarly, features, functionality, and components may be omitted unless the context clearly indicates otherwise. It should also be understood that, depending on the example, certain acts or events of any of the processes or methods described herein may be performed in a different sequence, may be added, merged, or left out altogether (e.g., all described acts or events may not be necessary to carry out the techniques).

Unless otherwise specifically defined herein, all terms are to be given their broadest possible interpretation including meanings implied from the specification as well as meanings understood by those skilled in the art and/or as defined in dictionaries, treatises, etc. It must also be noted that, as used in the specification and the appended claims, the singular forms "a," "an" and "the" include plural referents unless otherwise specified, and that the terms "comprises" and/or "comprising," when used in this specification, specify the presence of stated features, elements, and/or components, but do not preclude the presence or addition of one or more other features, steps, operations, elements, components, and/or groups thereof.

What is claimed is:

1. A load sensing spinal implant, comprising:
    a receiver comprising a U-shaped cavity for supporting a longitudinal rod and set screw therein, the receiver including a lower cavity configured to couple to a pedicle screw;
    a side portion integrally connected to the receiver and including a housing defining a sealed cavity for supporting a microelectronics assembly and a battery therein;
    at least one antenna attached to an outside of the housing and being in electrical communication with the microelectronics assembly; and
    at least one strain gauge configured to detect a localized force experienced by the receiver and being in electrical communication with the microelectronics assembly;
    wherein the at least one antenna is configured to transmit information received from the at least one strain gauge to an external device,
    wherein the receiver is connected to the side portion by an isolation beam, and
    wherein the isolation beam further comprises an internal cylindrical cavity that extends through the isolation beam and into the cavity defined by the housing, the at least one strain gauge being disposed inside of the cylindrical cavity.

2. The load sensing spinal implant of claim 1, wherein the at least one antenna is configured to utilize a Medical Implant Communication System (MICS) technology.

3. The load sensing spinal implant of claim 1, wherein the at least one antenna is configured to utilize a Bluetooth low energy (BLE) technology.

4. The load sensing spinal implant of claim 1, wherein an overmold is configured to surround the at least one antenna thereby forming a hermetic seal over the at least one antenna.

5. The load sensing spinal implant of claim 1, wherein the sealed cavity is hermetically sealed.

6. The load sensing spinal implant of claim 1, wherein at least one pass through connection extends through a sidewall of the housing thereby placing the at least one antenna in electrical communication with the microelectronics assembly.

7. The load sensing spinal implant of claim 1, wherein the housing further comprises a cover configured to seal an opening of the cavity for placing the microelectronics assembly therein.

8. The load sensing spinal implant of claim 7, wherein the cover is welded to the housing.

9. The load sensing spinal implant of claim 1, further comprising at least one of: a temperature sensor, an accelerometer sensor, a gyroscope sensor, and an impedance sensor.

10. The load sensing spinal implant of claim 1, further comprising the microelectronics assembly, wherein the microelectronics assembly further comprises a memory storage configured to periodically store information received from the at least one strain gauge.

11. The load sensing spinal implant of claim 1, further comprising the microelectronics assembly, wherein the microelectronics assembly further comprises a wake-up sensor configured to power up the microelectronics assembly and cause the at least one antenna to initiate a transmission of information to the external device.

12. The load sensing spinal implant of claim 1, wherein a size and shape of the at least one strain gauge corresponds to a diameter of the cylindrical cavity.

13. The load sensing spinal implant of claim 1, wherein the at least one strain gauge is disposed within a cavity inside of the receiver at a relative height that disposes the at least one strain gauge at a height that is above a lower surface of the U-shaped cavity.

14. The load sensing spinal implant of claim 1, wherein the at least one strain gauge is disposed within a cavity inside of the receiver at a relative height that disposes the at least one strain gauge at a height that is below a lower surface of the U-shaped cavity.

15. A load sensing spinal implant, comprising:
    a receiver comprising a U-shaped cavity for supporting a longitudinal rod and set screw therein, the receiver including a lower cavity configured to couple to a pedicle screw;
    a side portion integrally connected to the receiver by an isolation beam, the side portion including a housing defining a sealed cavity for supporting a microelectronics assembly and a battery therein;
    at least one antenna attached to an outside of the housing and being in electrical communication with the microelectronics assembly, the at least one antenna being configured to utilize a Medical Implant Communication System (MICS) technology; and
    at least one strain gauge disposed in a region corresponding to the isolation beam, the at least one strain gauge being configured to detect a localized force experienced by the receiver and being in electrical communication with the microelectronics assembly,
    wherein the at least one antenna is configured to transmit information received from the at least one strain gauge to an external device, and
    wherein the isolation beam further comprises an internal cylindrical cavity that extends through the isolation beam and into the cavity defined by the housing, the at least one strain gauge being disposed inside of the cylindrical cavity on a sidewall thereof closest to the U-shaped cavity.

* * * * *